United States Patent [19]

Kogane

[11] Patent Number: 4,723,153

[45] Date of Patent: Feb. 2, 1988

[54] PHOTOGRAPHIC PAPER ACCOMMODATING APPARATUS

[75] Inventor: Mikio Kogane, Kanagawa, Japan

[73] Assignee: Fuji Photo Film Co., Ltd., Kanagawa, Japan

[21] Appl. No.: 911,182

[22] Filed: Sep. 24, 1986

[30] Foreign Application Priority Data

| | | | |
|---|---|---|---|
| Sep. 24, 1985 | [JP] | Japan | 60-210823 |
| Oct. 24, 1985 | [JP] | Japan | 60-238518 |
| Oct. 24, 1985 | [JP] | Japan | 60-238520 |
| Oct. 25, 1985 | [JP] | Japan | 60-238688 |
| Oct. 25, 1985 | [JP] | Japan | 60-238689 |
| Oct. 25, 1985 | [JP] | Japan | 60-238687 |
| Oct. 28, 1985 | [JP] | Japan | 60-240786 |
| Oct. 30, 1985 | [JP] | Japan | 60-243689 |

[51] Int. Cl.[4] .................... G03B 29/00

[52] U.S. Cl. .................... 355/29; 355/28; 355/72

[58] Field of Search .................... 355/27, 28, 29, 72

[56] References Cited

U.S. PATENT DOCUMENTS 4,639,118 1/1987 Kogane et al. .................... 355/28

*Primary Examiner*—Monroe H. Hayes

*Attorney, Agent, or Firm*—Sughrue, Mion, Zinn, Macpeak, and Seas

[57] ABSTRACT

A photographic paper accommodating apparatus is disposed on the downstream side of a printing section for transporting an exposed continuous photographic paper to a subsequent step. A pair of first clamping and transporting rollers are disposed on the downstream side of the printing section so as to clamp and transport the photographic paper and form a first loop of photographic paper between the printing section and the rollers. A pair of second clamping and transporting rollers are disposed on the downstream side of the first clamping and transporting rollers so as to clamp and transport the photographic paper and form a second loop of photographic paper between the first and second clamping and transporting rollers. The apparatus is further provided with a flap which is movable between a first position at which the flap guides the photographic paper toward the first clamping and transporting rollers, and a second position at which the flap guides the photographic paper toward the second clamping and transporting rollers. Accordingly, it is possible to resume the exposure operation at the printing section even when it has been suspended immediately prior thereto.

27 Claims, 29 Drawing Figures

PHOTOGRAPHIC PAPER ACCOMMODATING APPARATUS

BACKGROUND OF THE INVENTION

1. Field of the Invention

The present invention relates to a photographic paper accommodating apparatus for advancing forward a continuous photographic paper having been subjected to printing to a subsequent step in which the paper is processed by, for example, a developing machine.

2. Description of the Prior Art

One type of photographic printer is arranged such that a developing machine is dispposed on the downstream side of a printing section where the image of a negative film is printed on a photographic paper by light exposure, so as to continuously develop the exposed photographic paper. This type of photographic printer needs a photographic paper accommodating apparatus between the printing section and the developing machine for the purpose of absorbing a difference between the photographic paper feed rate at the printing section and that at the developing machine.

In one type of conventional photographic paper accommodating apparatus, the portion of the continuous photographic paper delivered thereto at a relatively high feed rate from the printing section is temporarily accommodated in the form of a loop, thereby allowing absorption of the feed rate difference between the printing section and the developing machine where the photographic paper is processed at relatively low speed.

In this type of accommodting apparatus, when the exposure operation at the printing section is to be temporarily suspended, the intermediate portion of the continuous photographic paper is cut by means of a cutter disposed between the accommodating apparatus and the developing machine, thereby allowing the portion of the photographic paper in the developing machine to move freely. In this way, it is possible when resuming the exposure operation at the printing section to immediately start the operation, and the portion of the photographic paper already accommodated in the form of a loop can be successively advanced to the developing machine. The accommodating apparatus has another cutter disposed between the apparatus and the printing section, so that when the printing operation is to be finished, the intermediate portion of the photographic paper is cut by this cutter, thereby allowing all of the exposed portion of the photographic paper to be developed without wastefully developing any portion of the photographic paper which need not be developed.

Accordingly, this type of conventional photographic paper accommodating apparatus needs two cutters respectively disposed between the apparatus and the developing machine and between the apparatus and the printing section, which means that the maintenance of the apparatus is complicated.

Further, when the photographic paper is cut by the cutter disposed between the printing section and the accommodating apparatus for the purpose of finishing the exposure operation at the printing section, it is not possible to immediately resume the operation when required for any rason, since the photographic paper cannot be advanced to the accommodating apparatus until all the portion of the paper accommodated in the looping area of the apparatus has been fed to the developing machine.

SUMMARY OF THE INVENTION

In view of the above-described circumstances, it is a primary object of the present invention to provide a photographic paper accommodating apparatus which has a reduced number of required cutters and enables the exposure operation at the printing section to be resumed even when it has been suspended immediately prior thereto.

To this end, according to one aspect of the present invention, there is provided a photographic paper accommodating apparatus which is disposed on the downstream side of a printing section for transporting an exposed continuous photographic paper to a subsequent step, which comprises: first clamping and transporting roller means disposed on the downstream side of the printing section so as to clamp and transport the photographic paper and form a first loop of the photographic paper between the printing section and the roller means; second clamping and transporting roller means disposed on the downstream side of the first clamping and transporting roller means so as to clamp and transport the photographic paper and form a second loop of the photographic paper between the first and second clamping and transporting roller means; and a guide member movable between a first position at which the guide member guides the photographic paper toward the first clamping and transporting roller means, and a second position at which the guide member guides the photographic paper toward the second clamping and transporting roller means.

By virtue of the above arrangement of the present invention, when the exposure operation at the printing section is to be temporarily suspended, the intermediate portion of the photographic paper is cut by a cutter disposed between the printing section and the accommodating apparatus, thereby allowing the developing operation to be continued. When the exposure operation is to be resumed, the guide member is moved from the second position so as to open the second looping area and allow the loop of the photographic paper in the first looping area to move to the second looping area. The guide member is then moved to the first position so that the leading end portion of the photographic paper which has been cut and newly advanced forward is guided to the first clamping and transporting roller means. Then, the guide member is further moved from the first position so as to open the first looping area, thereby allowing the photographic paper to form a loop in the first looping area.

Accordingly, it is not necessary to provide another cutter between the accommodating apparatus and the developing machine. In addition, a plurality of loops of the photographic paper are formed by enabling the conventionally disposed guide member to move between the first and second positions, thereby allowing the exposure operation at the printing section to be resumed even when it has been suspended immediately prior thereto.

According to another aspect of the present invention, the above-described photographic paper accommodating apparatus further comprises limit means for limiting the lateral movement of the photographic paper.

The limit means is provided in opposing relation to either the first or second loop of the photographic paper so as to limit the lateral movement of the photographic paper. Thus, the looped portion of the photographic paper is prevented from meandering, so that stable feed of the paper is ensured.

DETAILED DESCRIPTION OF THE PREFERRED EMBODIMENTS

Figure 1:
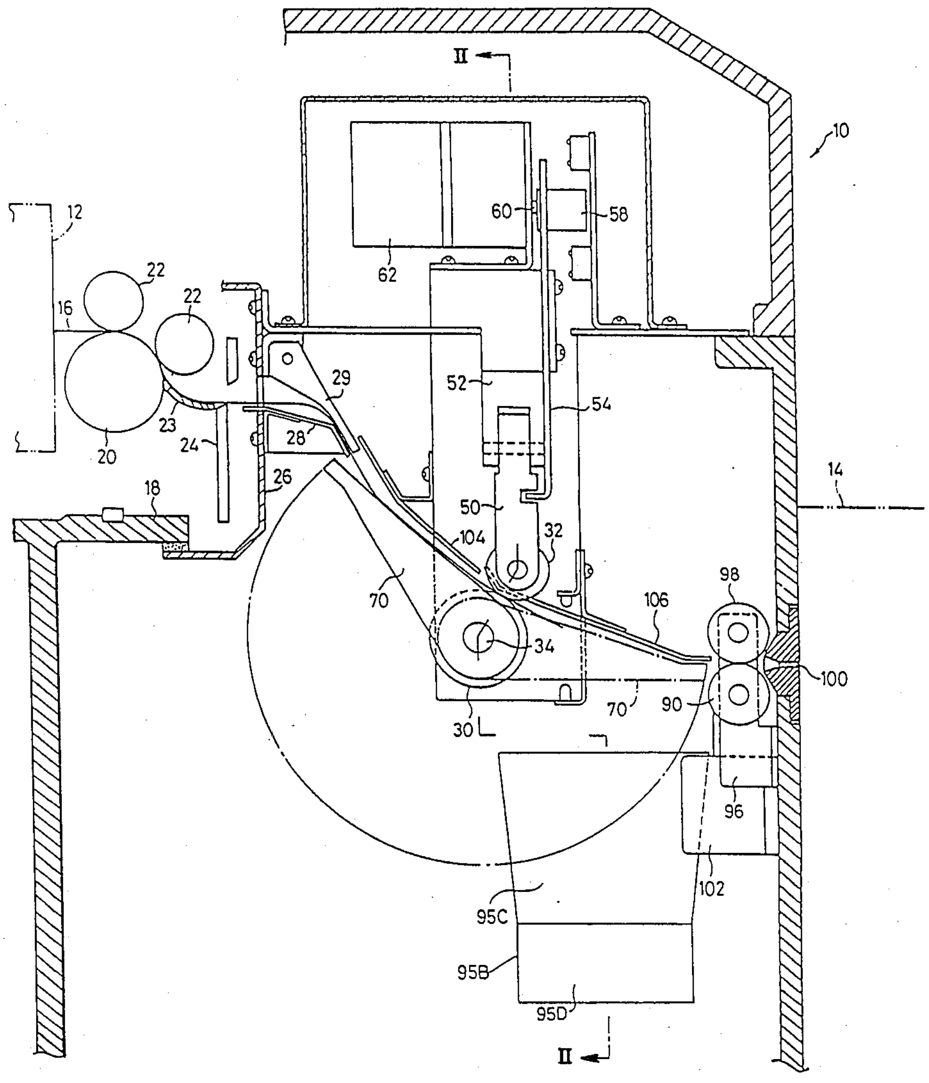
FIG. 1 is a sectional view of a first embodiment of the photographic paper accommodating apparatus according to the present invention.
Figure 2:
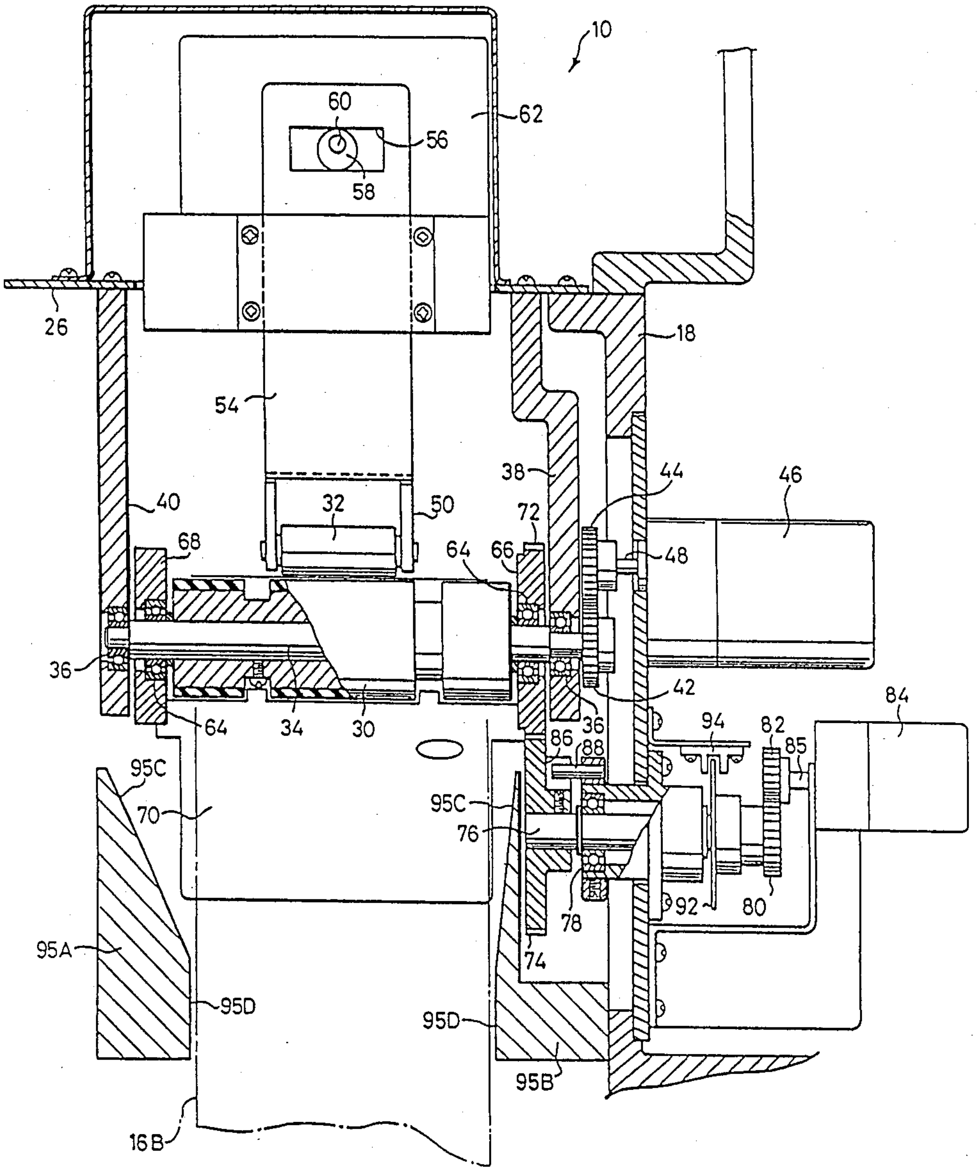
FIG. 2 is a sectional view taken along the line II—II in FIG. 1.

FIGS. 1 and 2 show a photographic paper accommodating apparatus 10 in accordance with a first embodiment of the present invention. The apparatus 10 is disposed between a printing section 12 and a developing section 14 so as to guide a continuous photographic paper 16 exposed in the printing section 12 to the developing section 14.

The photographic paper accommodating apparatus 10 has a machine frame 18 which is formed integrally with the machine frame of the printing section 12. A delivery roller 20 is rotatably supported by the frame 18 on the side thereof which is closer to the printing section 12, that is, on the downstream side of the section 12. The delivery roller 20 is rotated by the driving force derived from a motor (not shown) so as to feed a continuous photographic paper 16 to the accommodating apparatus 10, the paper 16 being clamped between the roller 20 and a pressure roller 22 abutting against the outer periphery of the roller 20.

A guide plate 23 and a cutter 24 are provided between the delivery roller 20 and the accommodating apparatus 10, whereby the intermediate portion of the photographic paper 16 can be cut as desired.

A bracket 26 is secured to the machine frame 18, and guide plates 28 and 29 are mounted on the bracket 26 so as to be positioned on the downstream side of the cutter 28. The guide plates 28 and 29 serve to guide the photographic paper 16 to the area between first clamping and transporting rollers 30 and 32. The roller 30 has a support shaft 34 integrally secured thereto. As shown in FIG. 2, the support shaft 34 has both end portions thereof rotatably supported by bearing plates 38 and 40 through bearings 36, respectively. The bearing plates 38 and 40 are suspended from the bracket 26.

A gear 42 is secured to the distal end portion of the support shaft 34 which projects from the bearing plate 38. The gear 42 is meshed with a gear 44 which is secured to the output shaft 48 of a motor 46 mounted on the machine frame 18. Thus, it is possible to transmit the rotational force from the motor 46 to the first clamping and transporting roller 30 so as to rotate it.

The first clamping and transporting roller 32 pressed against the roller 30 is rotatably supported by a bearing plate 50. The bearing plate 50 is guided by a bracket 52 secured to the bracket 26 in such a manner that the plate 50 is movable in the direction in which the roller 32 comes in and out of contact with the roller 30. The bearing plate 50 is engaged with the lower end portion of a lifting plate 54 which has a rectangular window 56 formed in its upper end portion, as shown in FIG. 2. An eccentric cam 58 is received in the window 56. The cam 58 has an eccentric shaft 60 which is defined by the output shaft of a motor 62 supported by the bracket 26.

Accordingly, as the motor 62 rotates, the lifting plate 54 moves vertically, thus enabling the roller 32 to come in and out of contact with the roller 30.

As shown in FIG. 2, rotary plates 66 and 68 are rotatably supported on the support shaft 34 of the first clamping and transporting roller 30 through respective bearings 64, the plates 66 and 68 being respectively disposed between the roller 30 and the bearing plate 38 and between the roller 30 and the bearing plate 40. Side edges at one end of a flap 70 which defines a guide member are respectively secured to the rotary plates 66 and 68.

The rotary plate 66 is formed on its outer periphery with a gear 72 which is meshed with a gear 74. The shaft 76 of the gear 74 is rotatably supported by the machine frame 18 through a bearing 78. A gear 80 is secured to the distal end portion of the shaft 76 which projects from the frame 18, and is meshed with a gear 82. The gear 82 is secured to the output shaft 85 of a motor 84 which is mounted on the frame 18. Accordingly, the flap 70 can be pivoted by the driving force derived from the motor 84.

As shown in FIG. 2, the gear 74 has a recess 86 formed in a portion thereof, and a limit pin 88 projecting from the frame 18 extends into the recess 86 so as to limit the rotational angle of the flap 70. The rotational angle of the flap 70 ranges, as shown in FIG. 1, between a first position at which the flap 70 is stretched between the guide plate 28 and the first clamping and transporting roller 30 and a second position at which the flap 70 is stretched between the roller 30 and a second clamping and transporting roller 90. The rotational position of the flap 70 is controlled by detecting the rotational angle of a rotary plate 92 secured to the shaft 76 by means of a sensor 94, as shown in FIG. 2.

Figure 3A:
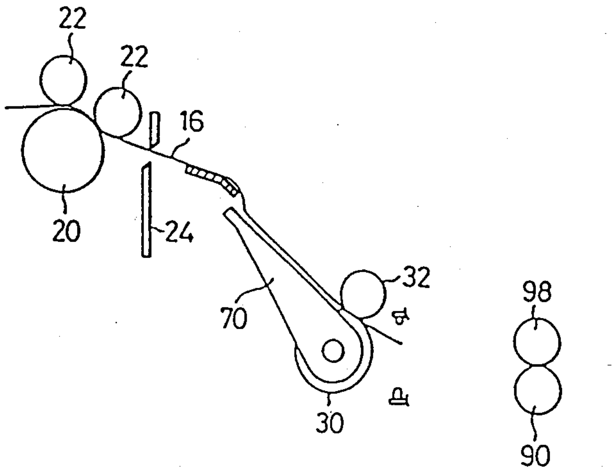
FIGS. 3(A) to 3(E) show the guide member illustrated in FIG. 1 in various operative states, respectively.
Figure 3B:
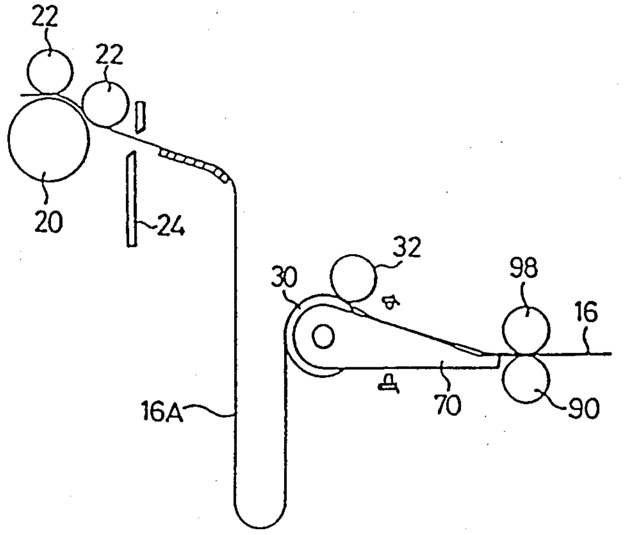
Figure 3C:
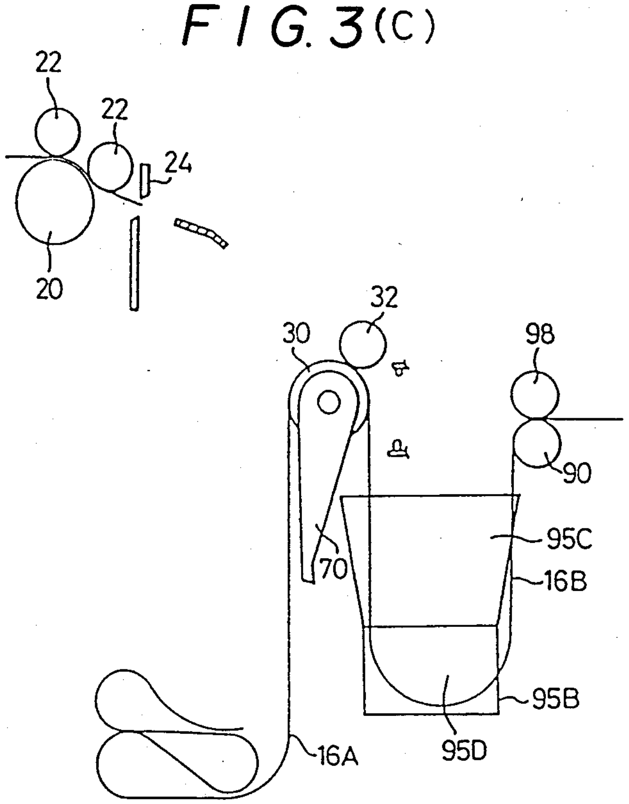

When the flap 70 lies between the second position and the vertically downward position, it is possible for a first loop 16A of the photogrpahic paper 16 to be formed between the guide plate 28 and the first clamping and transporting roller 30 as shown in FIG. 3(B); and when the flap 70 lies between the first position and the vertically downward position, it is possible for a second loop 16B to be formed between the first and second clamping and transporting rollers 30 and 90 as shown in FIG. 3(C).

Guide blocks 95A and 95B which define limit means shown in FIGS. 1 and 2 are disposed below the area between the first and second clamping and transporting rollers 30 and 90 in such a manner that the guide blocks 95A and 95B are in opposing relation to the second loop 16B formed as shown in FIG. 3(C).

These guide blockes 95A and 95B are supported by the machine frame 18 in such a manner that they oppose the lateral edges, respectively, of the second loop 16B. The respective upper end portions of the guide blocks 95A and 95B are tapered so that the distance between the opposing surfaces thereof is gradually increased toward the upper side thereof, thus providing tapered portions 95C. The lower halves of the guide blocks 95A and 95B respectively define parallel portions 95D which extend parallel to each other at a spacing slightly larger than the width of the photographic paper 16.

Accordingly, the lower end portion of the second loop 16B is prevented from meandering to a substantial extent in the lateral direction thereof by virtue of the tapered portions 95C, so that the longitudinal axis of the second loop 16B is kept straight at all times. If there were no guide blocks 95A and 95B for limiting the lateral movement of the photographic paper 16, the second loop 16B which is defined by a portion of the photographic paper 16 delivered from the first clamping and transporting rollers 30 and 32 would meander to a substantial extent.

As shown in FIG. 1, the second clamping and transporting roller 90 is rotatably supported by the machine frame 18 through a bracket 96, and a second clamping and transporting roller 98 is disposed so as to abut against the roller 90. Accordingly, when the flap 70 reaches the second position as shown by the imaginary line in FIG. 1, the second clamping and transporting rollers 90 and 98 clamp the leading end portion of the photographic paper 16 guided by the flap 70 and advance it to the developing section 14 through a slit 100. For this purpose, the rotational force derived from a motor 102 is transmitted to the roller 90.

Guide plates 104 and 106 are respectively disposed at the first and second positions of the flap 70 in such a manner as to extend above and along the passing photographic paper 16, whereby the paper 16 is smoothly guided to the first clamping and transporting rollers 30 and 32 and to the second clamping and transporting rollers 90 and 98.

The following is a description of the operation of this embodiment.

Prior to the start of an exposure operation at the printing section 12, the flap 70 is disposed at the first position as shown by the solid line in FIGS. 1 and 3(A).

The leading end portion of the photographic paper 16 that has been exposed in the printing section 12 is delivered by the action of the delivery rollers 20 and 22 to reach the guide plate 28. The leading end portion of the paper 16 is then projected from the guide plates 28 and fed to the area between the first clamping and transporting rollers 30 and 32 while moving through the area between the flap 70 and the guide plate 104. When a slight amount of the leading end portion of the photographic paper 16 has been clamped between the first clamping and transporting rollers 30 and 32, the rotation of the motor 46 is suspended, and the movement of the leading end portion of the paper 16 is thereby stopped.

Then, the flap 70 is rotated counterclockwise as viewed in FIG. 1 so as to move to the second position, as shown in FIG. 3(B). At the same time, the operation of the motor 46 is resumed. Since the intermediate portion of the photographic paper 16 exposed at the printing section 12 is delivered therefrom at a relatively high feed rate, the first loop 16A is formed between the guide plate 28 and the first clamping and transporting roller 30.

At the same time, the leading end portion of the photographic paper 16 fed out from the area between the first clamping and transporting rollers 30 and 32 moves on the flap 70 so as to reach the area between the second clamping and transporting rollers 90 and 98 from which it is advanced by the rotation of the motor 102 to the developing section 14 where the paper 16 is successively developed.

When the leading end portion of the photographic paper 16 has been fed out from the area between the second clamping and transporting rollers 90 and 98 by the rotation of the motor 102, the first clamping and transporting roller 32 is moved upwards by the rotation of the motor 62 so as to separate from the roller 30, so that the photographic paper 16 is advanced to the developing section 14 by the force of the motor 102 alone.

When the exposure operation at the printing section 12 is to be temporarily suspended, the intermediate portion of the photographic paper 16 is cut by using the cutter 24. Even during the suspension of the exposure operation, the exposed photographic paper 16 is gradually delivered to the developing section 14 at a relatively low feed rate, thereby allowing the developing operation to proceed.

To resume the exposure operation at the printing section 12 in a state wherein the trailing end portion of the exposed photographic paper 16 remains in the form of the first loop 16A between the guide plate 28 and the first clamping and transporting roller 30, the flap 70 is moved from the second position to the vertically downward position by driving the motor 46, as shown in FIG. 3(C). Under this state, the first clamping and transporting roller 32 is brought into contact with the roller 30, and the roller 30 is rotated by driving the motor 46. In consequence, the photographic paper 16 in the form of the first loop 16A is moved so as to form the second loop 16B.

In the area for forming the second loop 16B, the guide blocks 95A and 95B serve to limit the lateral movement of the second loop 16B. Since the second loop 16B is formed in such a manner that the rotation of the second clamping and transporting rollers 90 and 98 is suspended, whereas the first clamping and transporting rollers 30 and 32 are kept rotating, the second loop 16B, which is subjected to the advancing force alone, is apt to meander in the lateral direction thereof. However, it is prevented from meandering by virtue of the tapered portions 95C and the parallel portions 95D, thus enabling the second loop 16B to be reliably transported.

Figure 3D:
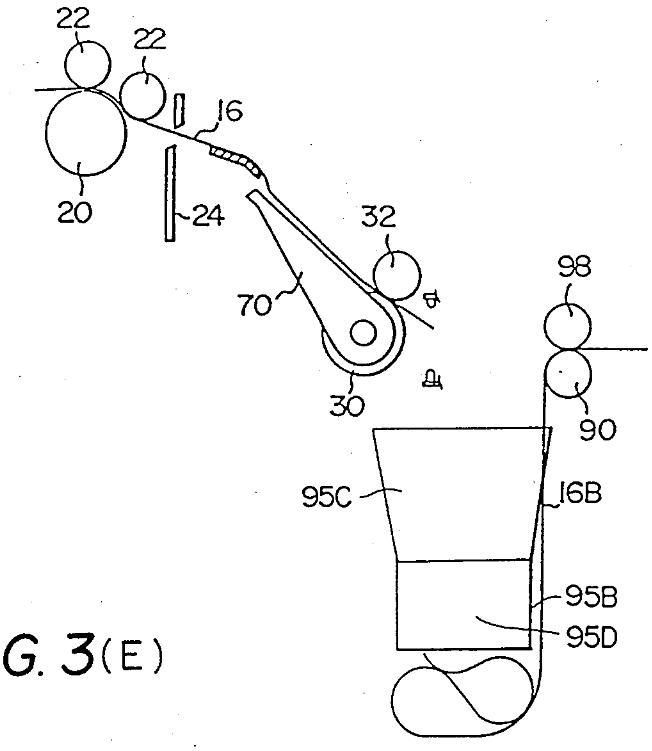
Figure 3E:
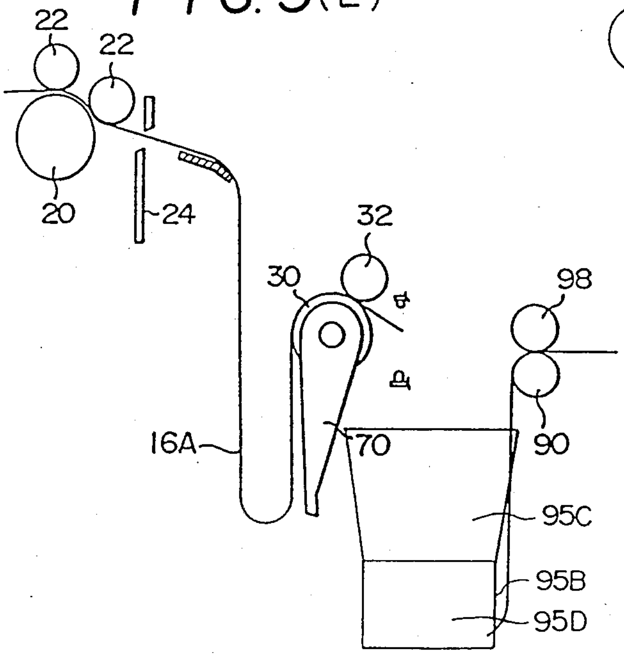

As the delivery of the photographic paper 16 by the first clamping and transporting rollers 30 and 32 further proceeds, the trailing end portion of the paper 16 is suspended down from the second clamping and transporting roller 90, as shown in FIG. 3(D). At this time, the flap 70 is moved to the first position at which it prevents the formation of the first loop 16A, and the exposure operation at the printing section 12 is then resumed.

Thus, the leading end portion of the newly exposed photographic paper 16 is advanced to the area between the first clamping and transporting rollers 30 and 32 while being guided by the flap 70. With the leading end portion of the paper 16 clamped between the rollers 30 and 32, the rotation of the roller 30 is suspended again, and the flap 70 is moved from the first position and stopped at, for example, the position at which it is suspended vertically downward. As the exposure operation at the printing section 12 proceeds, the exposed portion of the photographic paper 16 is successively accommodated in the apparatus 10 in the form of the first loop 16A.

Thus, even when the trailing end portion of the cut photographic paper 16 which has been exposed before the suspension of the exposure operation remains undeveloped in the apparatus 10, the leading end portion of the cut photographic paper 16 which is delivered after the resumption of the exposure operation can be accommodated in the first loop accommodating portion of the apparatus 10.

On the other hand, the conventional photographic paper accommodating apparatus can form only one loop of photographic paper and therefore disadvantageously needs two cutters in the front of and at the rear of the apparatus, respectively. In addition, when the loop of photographic paper formed before the suspension of the exposure operation remains in the apparatus at the time of the resumption of the operation, it is not possible to resume the exposure operation.

The first loop 16A, which is accommodated in the area between the pair of rollers 20, 22 and the first clamping and transporting rollers 30, 32, is formed while the first clamping and transporting rollers 30 and 32 are rotating. It is therefore more difficult for the first loop 16A to meander than the second loop 16B. However, guide blocks 95A and 95B similar to those for the second loop 16B may also be provided for the first loop 16A.

In addition, the limit means employed in the present invention is not necessarily limitative to that which is defined by the above-described guide blocks 95A and 95B, and any type of limit means may be employed, provided that it is capable of preventing meandering of the photographic paper 16.

A second embodiment of the present invention will be described below.

Figure 4:
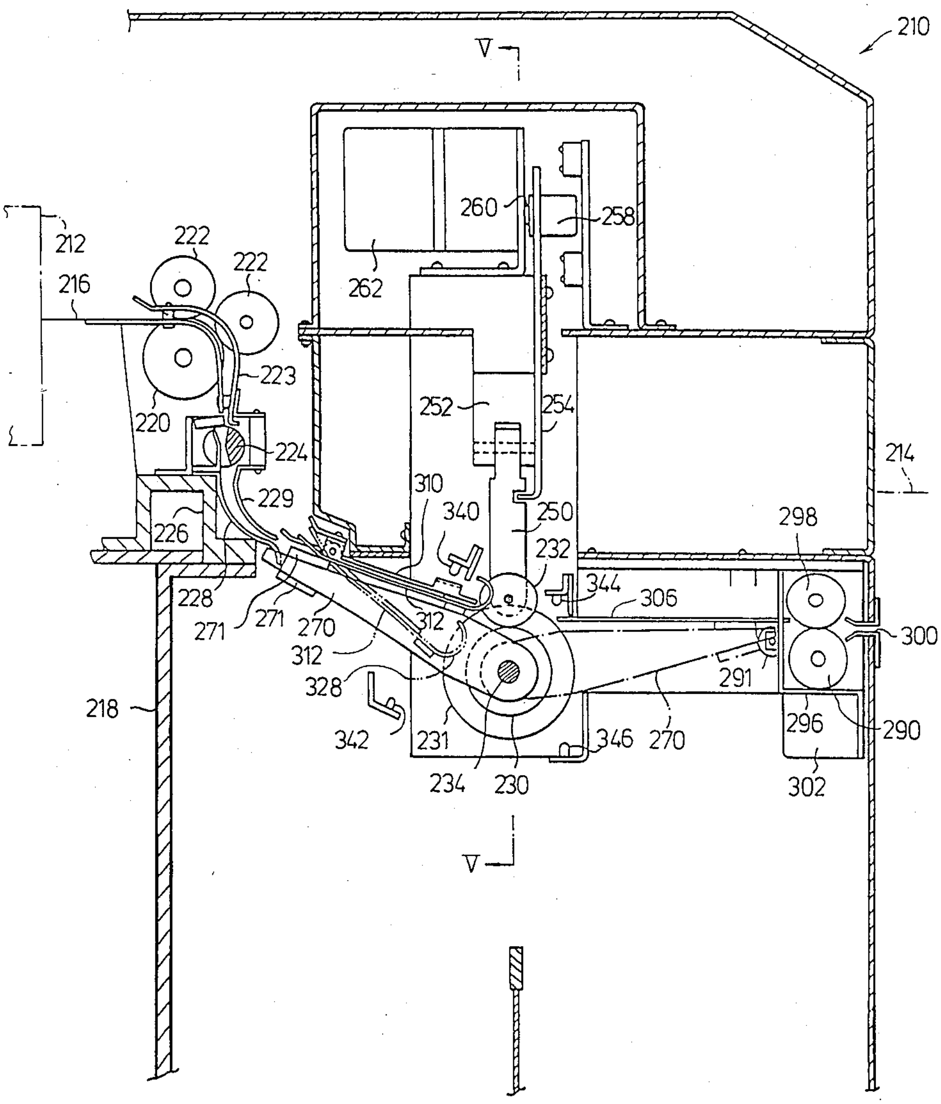
FIG. 4 is a sectional view of a second embodiment of the photographic paper accommodating apparatus according to the present invention.
Figure 5:
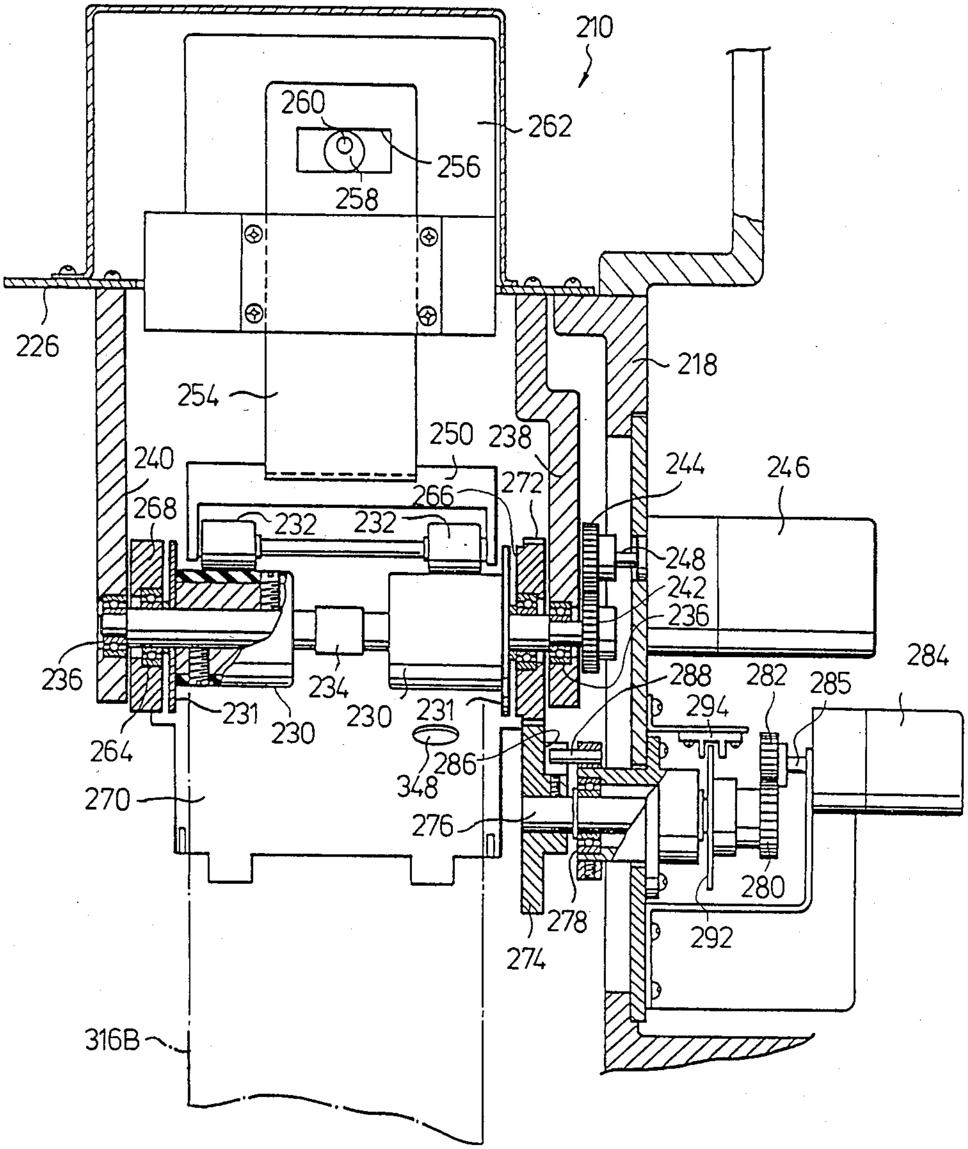
FIG. 5 is a sectional view taken along the line V—V in FIG. 4.

FIGS. 4 and 5 show a photographic paper accommodating apparatus 210 in accordance with a second embodiment of the present invention. The apparatus 210 is disposed between a printing section and a developing section 214 so as to guide a continuous photographic paper 216 exposed in the printing section 212 to the developing section 214.

The photographic paper accommodating apparatus 210 has a machine frame 218 which is formed integrally with the machine frame of the printing section 212. A delivery roller 220 is rotatably supported by the frame 218 on the side thereof which is closer to the printing section 212, that is, on the downstream side of the section 212. The delivery roller 220 is rotated by the driving force derived from a motor (not shown) so as to feed a continuous photographic paper 216 to the accommodating apparatus 210, the paper 216 being clamped between the roller 220 and a pressure roller 222 abutting against the outer periphery of the roller 220.

A guide plate 223 and a cutter 224 are provided between the delivery roller 220 and the accommodating apparatus 210, whereby the intermediate portion of the photographic paper 216 can be cut as desired.

A bracket 226 is secured to the machine frame 218, and guide plates 228 and 229 are mounted on the bracket 226 so as to be positioned on the downstream side of the cutter 228 The guide plates 228 and 229 serve to guide the photographic paper 216 to the area between first clamping and transporting rollers 230 and 232. The roller 230 has a pair of flanges 231, which define lateral movement limit means and a support shaft 234 integrally secured thereto. As shown in FIG. 5, the support shaft 234 has both end portions thereof rotatably supported by bearing plates 238 and 240 through bearings 236, respectively. The bearing plates 238 and 240 are suspended from the bracket 226.

A gear 242 is secured to the distal end portion of the support shaft 234 which projects from the bearing plate 238. The gear 242 is meshed with a gear 244 which is secured to the output shaft 248 of a motor 246 mounted on the machine frame 218. Thus, it is possible to transmit the rotational force from the motor 246 to the first clamping and transporting roller 230 so as to rotate it.

The first clamping and transporting roller 232 pressed against the roller 230 is rotatably supported by a bearing plate 250. The bearing plate 250 is guided by a bracket 252 secured to the bracket 226 in such a manner that the plate 250 is movable in the direction in which the roller 232 comes in and out of contact with the roller 230. The bearing plate 250 is engaged with the lower end portion of a lifting plate 254 which has a rectangular window 256 formed in its upper end portion, as shown in FIG. 5. An eccentric cam 258 is received in the window 256. The cam 258 has an eccentric shaft 260 which is defined by the output shaft of a motor 262 supported by the bracket 226.

Accordingly, as the motor 262 rotates, the lifting plate 54 moves vertically, thus enabling the roller 232 to come in and out of contact with the roller 230.

As shown in FIG. 5, rotary plates 266 and 268 are rotatably supported on the support shaft 234 of the first clamping and transporting roller 230 through respective bearings 264, the plates 266 and 268 being respectively disposed between the roller 230 and the bearing plate 238 and between the roller 230 and the bearing plate 240. Side edges at one end of a flap 270 which defines a guide member are respectively secured to the rotary plates 266 and 268.

The rotary plate 266 is formed on its outer periphery with a gear 272 which is meshed with a gear 274. The shaft 276 of the gear 274 is rotatably supported by the machine frame 218 through a bearing 278. A gear 280 is secured to the distal end portion of the shaft 276 which projects from the frame 218, and is meshed with a gear 282. The gear 282 is secured to the output shaft 285 of a motor 284 which is mounted on the frame 218. Accordingly, the flap 270 can be pivoted by the driving force derived from the motor 284.

As shown in FIG. 5, the gear 274 has a recess 286 formed in a portion thereof, and a limit pin 288 projecting from the frame 218 extends into the recess 286 so as to limit the rotational angle of the flap 270. The rotational angle of the flap 270 ranges, as shown in FIG. 4, between a first position at which the flap 270 is stretched between the guide plate 228 and the first clamping and transporting roller 230 and a second position at which the flap 270 is stretched between the roller 230 and a second clamping and transporting roller 290. The rotational position of the flap 270 is controlled by detecting the rotational angle of a rotary plate 292 secured to the shaft 276 by means of a sensor 294, as shown in FIG. 5. When the flap 270 is at the second position, a notched portion at the distal end of the flap 270 is engaged with an auxiliary roller 291 which is rotatably supported by the machine frame 218.

Figure 8A:
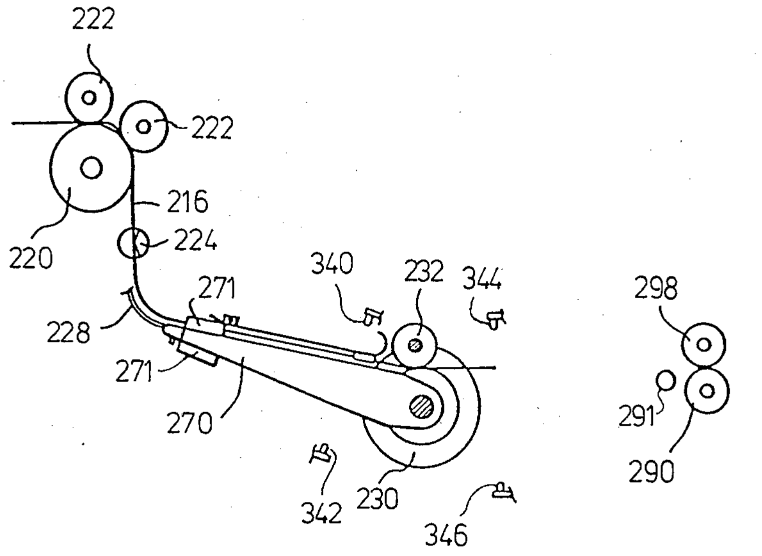
FIGS. 8(A) to 8(E) show the guide member illustrated in FIG. 4 in various operative states, respectively.
Figure 8B:
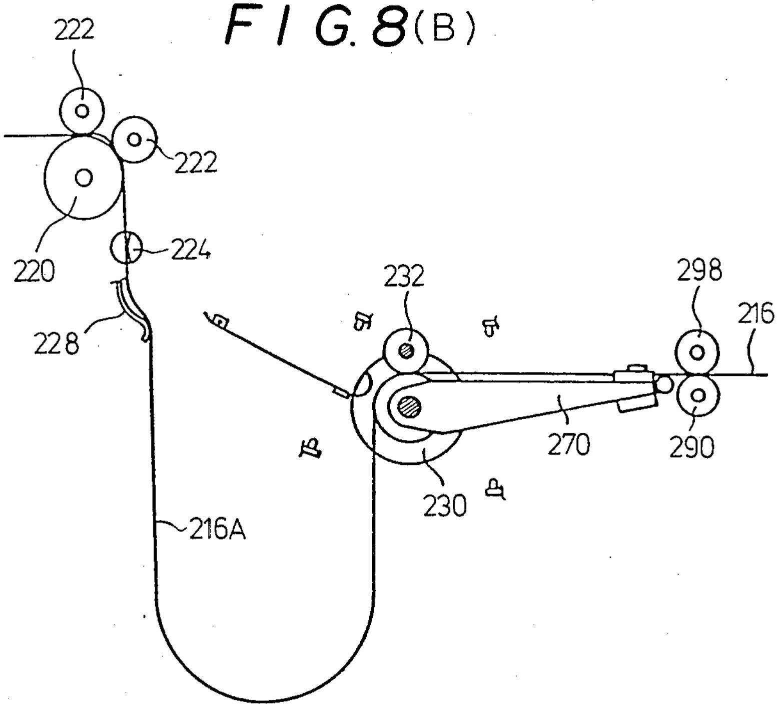
Figure 8C:
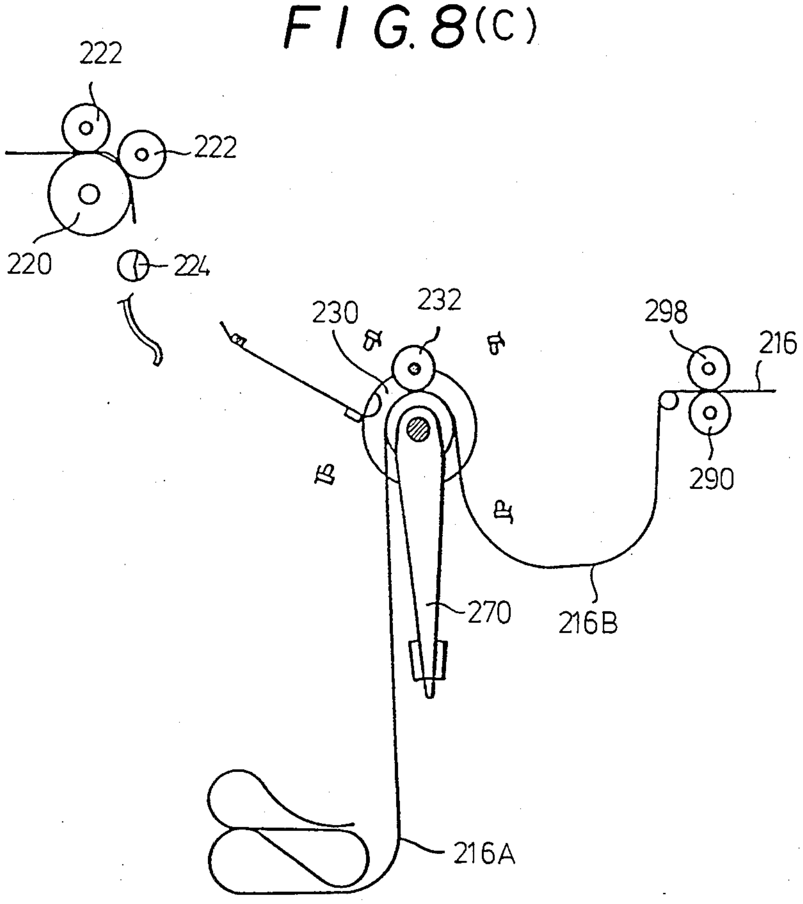

When the flap 270 lies between the second position and the vertically downward position, it is possible for a first loop 216A of the photographic paper 216 to be formed between the delivery roller 220 and the first clamping and transporting roller 230 as shown in FIG. 8(B); when the flap 270 lies between the first position and the vertically downward position, it is possible for a second loop 216B to be formed between the first and second clamping and transporting rollers 230 and 290 as shown in FIG. 8(C).

As shown in FIG. 4, the second clamping and transporting roller 290 is rotatably supported by the machine frame 218 through a bracket 296, and a second clamping and transporting roller 298 is disposed so as to abut against the roller 290. Accordingly, when the flap 270 reaches the second position as shown by the imaginary line in FIG. 4, the second clamping and transporting rollers 290 and 298 clamp the leading end portion of the photographic paper 216 guided by the flap 270 and advance it to the developing section 214 through a slit 300. For this purpose, the rotational force derived from a motor 302 is transmitted to the roller 290.

A guide plate 306 is disposed at the second position of the flap 270 in such a manner as to extend above and along the passing photographic paper 216, whereby the paper 216 is smoothly guided to the second clamping and transporting rollers 290 and 298.

Figure 6:
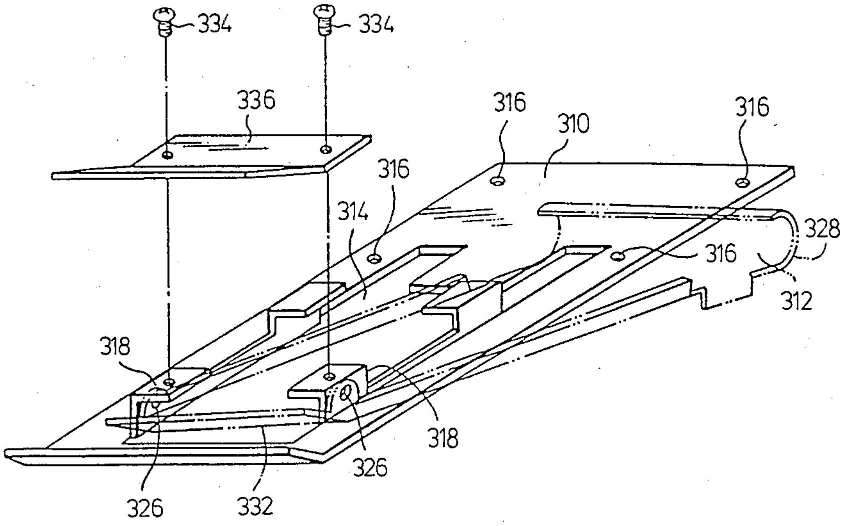
FIG. 6 is a perspective view of a bracket employed to secure the auxiliary flap provided in accordance with the second embodiment.
Figure 7:
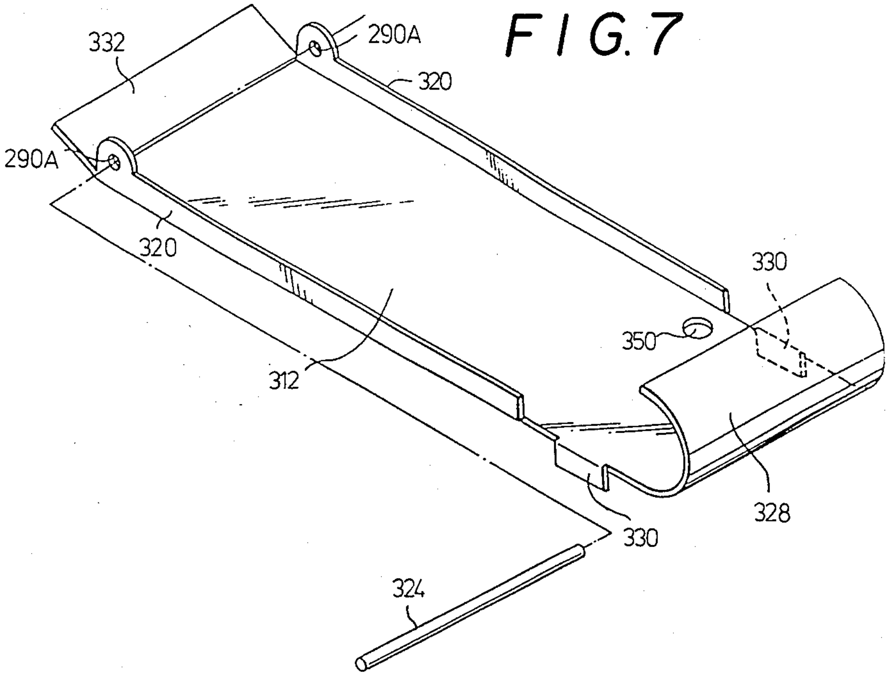
FIG. 7 is a perspective view of the auxiliary flap.

A bracket 310 is rigidly secured to the machine frame 218 in such a manner as to be disposed between the printing section 212 and the first clamping and transporting roller 230, and an auxiliary flap 312 is secured to the bracket 310. As shown in FIG. 6, the bracket 310 is formed from a thin-walled steel material which has a relatively large opening 314 provided in the center thereof, together with screw receiving bores 316 provided around the opening 314. Thus, the bracket 310 can be rigidly secured to the machine frame 218 using the screw receiving bores 316.

A pair of L shaped projecting pieces 318 are provided on a portion of the bracket 310 on the side thereof which is closer to the printing section 212. A pair of guide projections 320 respectively project from both the lateral edges of the auxiliary flap 312, these guide projections 320 defining limit means for limiting the lateral movement of the photographic paper 216. The guide projections 320 are disposed in such a manner that one end of each guide projection 320 opposes the corresponding L-shaped projecting piece 318. A bore 290 having a circular cross-section is formed in said end of each guide projection 320, and a pivot pin 324 extends through the bores 290. Thus, the auxiliary flap 312 is supported through the pin 324 in such a manner that the flap 312 is pivotal in the area between the printing section 212 and the first clamping and transporting roller 230.

One end portion of the auxiliary flap 312 which faces the first clamping and transporting roller 230 is curved such as to have a semi-circular cross-section, thereby providing a guide portion 328. Projecting pieces 330 project from both edges of a portion of the flap 312 which is close to the guide portion 328, the pieces 330 extending in the direction opposite to that in which the guide projections 320 project, so that the projecting pieces 330 can be contacted by the flap 270. More specifically, when the flap 270 is moved to the first position at which the distal end of the flap 270 is close to the guide plate 228, the flap 270 comes in contact with the projecting pieces 330, thus causing the auxiliary flap 312 to be pushed up to reach the solid line position shown in FIG. 4. In this position, the auxiliary flap 312 cooperates with the flap 270 to define a guide passage for guiding the photographic paper 216 from the printing section 212 to the first clamping and transporting roller 230. The height of this guide passage is determined by the amount by which the projecting pieces 330 project from the auxiliary flap 312.

The projecting pieces 330 further serve to limit the lateral movement of the passing photographic paper 216 in cooperation with projecting pieces 271 which respectively project from both lateral edges of the flap 270.

When the flap 270 is moved from the first position and suspended vertically downward, the auxiliary flap 312 is allowed to pivot about the pin 324 gravitationally until it reaches the imaginary line position shown in FIG. 4.

In this position, a stopper piece 332 which is formed at that end of the auxiliary flap 312 which is opposite to the guide portion 328 abuts against a stopper piece 336 which is rigidly secured to the L-shaped projecting pieces 318 of the bracket 310 by screws 334, thus preventing the auxiliary flap 312 from rotating furthermore. When the auxiliary flap 312 reaches the maximumly lowered position, the guide portion 328 covers the area between the first clamping and transporting rollers 230 and 232. More specifically, the auxiliary flap 312 is disposed in such a manner as to lie across the photographic paper transport passage defined between the pair of guide paltes 228, 229 and the first clamping and transporting rollers 230, 232, so that, when the trailing end of a portion of the photographic paper 216 which defines the first loop comes out of the area between the guide paltes 228 and 229, this trailing end portion is prevented by virtue of the auxiliary flap 312 from accidentally entering the area between the first clamping and transporting rollers 230 and 232 due to the rigidity of the photographic paper 216.

Sensor means 340 and 342 are disposed on the upstream side of the first clamping and transporting rollers 230 and 232 in order to detect whether or not the trailing end portion of the photographic paper 216 being moved from the printing section 212 has reached the first clamping and transporting rollers 230, 232. In addition, sensor means 344 and 346 are disposed on the downstream side of the first clamping and transporting rollers 230 and 232 in order to detect whether or not the leading end portion of the photographic paper 216 has been delivered from the first clamping and transporting rollers 230 and 232. These sensor means are defined by a combination of a light-emitting diode and a photodiode, and in order to allow the light from the light-emitting diode to pass through the flap 270 and the auxiliary flap 312, through-hole 348 and 350 are respectively provided in the flaps 270 and 312.

The following is a description of the operation of this embodiment.

Prior to the start of an exposure operation at the printing section 212, the flap 270 is disposed at the first position as shown by the solid line in FIG. 4. In this position, the flap 270 pushes up the auxiliary flap 312 through the projecting pieces 330 and cooperates with the auxiliary flap 312 to define a space for passing the photographic paper 216.

The leading end portion of the photographic paper 216 that has been exposed in the printing section 212 is delivered by the action of the delivery rollers 220 and 222 to reach the guide plate 228. The leading end portion of the paper 216 is advanced to the area between the first clamping and transporting rollers 230 and 232 while moving through the area between the flap 270 and the auxiliary flap 312. During this feed of the photographic paper 216, the lateral movement thereof is limited by the projecting pieces 271 formed on the flap 270 and the guide projections 320 formed on the auxiliary flap 312, and the flanges 231 formed on the first clamping and transporting roller 230 also serve to limit the lateral movement of the paper 216. Therefore, the leading end portion of the paper 216 is accurately fed to the area between the first clamping and transporting rollers 230 and 232 without any fear of the longitudinal axis of the paper 216 oscillating.

When the sensor means 344 and 346 detect the leading end of the photographic paper 216, the rotation of the motor 246 is suspended, and the movement of the leading end portion of the paper 16 is thereby stopped.

Then, the flap 270 is rotated counterclockwise as viewed in FIG. 4 so as to move to the second position, as shown in FIG. 8(B), and the auxiliary flap 312 is brought into the imaginary line position shown in FIG. 4 to cover the inlet portion of the first clamping and transporting roller 230. At the same time, the operation of the motor 246 is resumed. Since the intermediate portion of the photographic paper 216 exposed at the printing section 212 is delivered therefrom at a relatively high feed rate, the first loop 216A is formed between the guide plate 228 and the first clamping and transporting roller 230.

At the same time, the leading end portion of the photographic paper 216 fed out from the area between the first clamping and transporting rollers 230 and 232 moves on the flap 270 so as to reach the area between the second clamping and transporting rollers 290 and 298 from which it is advanced by the rotation of the motor 302 to the developing section 214 where the paper 216 is successively developed.

When the leading end portion of the photographic paper 216 has been fed out from the area between the second clamping and transporting rollers 290 and 298 by the rotation of the motor 302, the first clamping and transporting roller 232 is moved upwards by the rotation of the motor 262 so as to separate from the roller 230, so that the photographic paper 216 is advanced to the developing section 214 by the force of the motor 302 alone.

When the photographic paper 216 which is passed over the first clamping and transporting roller 230 is not subjected to the clamping force applied thereto from the first clamping and transporting roller 232. The paper 216 is apt to meander during the advancement. However, meandering of the paper 216 is prevented by virtue of the flanges 231 and the guide portion 328 of the auxiliary flap 312 which is disposed within the area between the flanges 231.

When the exposure operation at the printing section 212 is to be temporarily suspended, the intermediate portion of the photographic paper 216 is cut by using the cutter 224. Even during the suspension of the exposure operation, the exposed photographic paper 216 is gradually delivered to the developing section 214 at a relatively low feed rate, thereby allowing the developing operation to proceed.

When the trailing end portion of the thus cut photographic paper 216 is released from the guide plate 228, the trailing end portion of the paper 216 may spring back into the area between the first clamping and transporting rollers 230 and 232 due to the rigidity of the paper 216.

However, since in this embodiment the auxiliary flap 312 which has already been lowered by its own weight covers the front side of the first clamping and transporting rollers 230 and 232, there is no fear of the trailing end portion of the cut photographic paper 216 entering the area between the first clamping and transporting rollers 230 and 232.

To resume the exposure operation at the printing section 212 in a state wherein the trailing end portion of the exposed photographic paper 216 remains in the form of th first loop 216A between the guide plate 228 and the first clamping and transporting roller 230, the flap 270 is moved from the second position to the vertically downward position by driving the motor 246, as shown in FIG. 8(C). Under this state, the first clamping and transporting roller 232 is brought into contact with the roller 230, and the roller 230 is rotated by driving the motor 246. In consequence, the photographic paper 216 in the form of the first loop 216A is moved so as to form the second loop 216B.

Figure 8D:
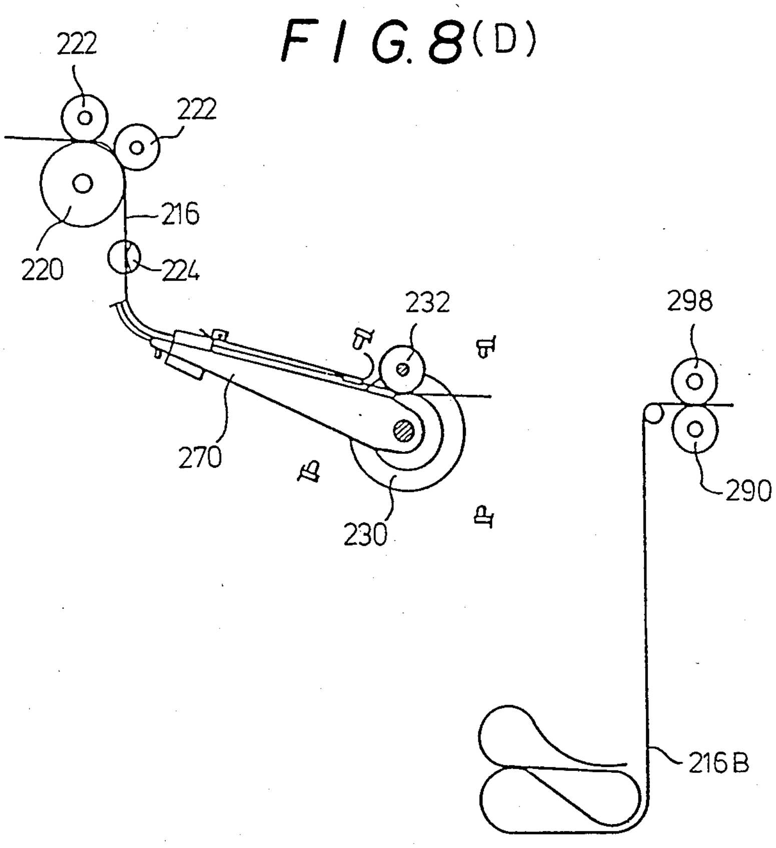
Figure 8E:
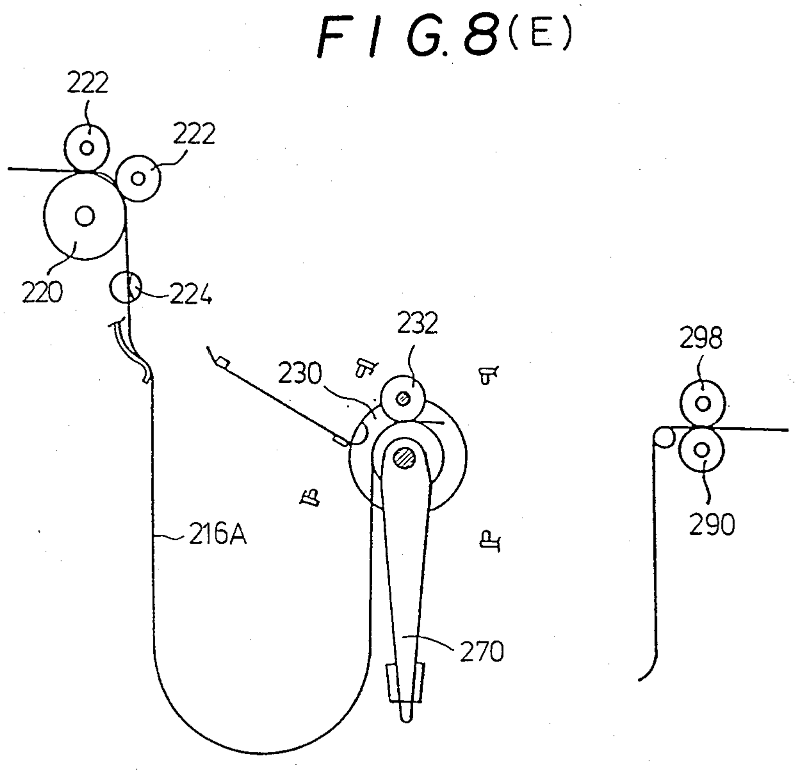

As the delivery of the photographic paper 216 by the first clamping and transporting rollers 230 and 232 further proceeds, the trailing end portion of the paper 216 is suspended down from the second clamping and transporting roller 290, as shown in FIG. 8(D). At this time, the flap 270 is moved to the first position at which it prevents the formation of the first loop 216A, and the exposure operation at the printing section 212 is then resumed.

This pivotal movement of the flap 270 is effected in response to a command for moving the flap 270 to the first position, the command being issued when the trailing end of the photographic paper 216 has passed through the area between the sensor means 344 and 346. However, there are cases where the trailing end portion of the photographic paper 216 remains in contact with the first clamping and transporting roller 230 due to the frictional force occurring between the same and the roller 230. In such cases, the sensor means 344 and 346 cannot detect the passage of the trailing end of the photographic paper 216; therefore, the flap 270 cannot be moved to the first position. However, since this embodiment has another pair of sensor means 340 and 342, if the flap 270 is turned to the first position when a predetermined period of time has elapsed after the trailing end of the photographic paper 216 has passed through the area between the sensor means 340 and 342, it is possible to reliably move the flap 270 to the first position even when the trailing end portion of the paper 216 is forced to remain on the first clamping and transporting roller 230 by the frictional force.

The provision of the sensor means 340 and 342 also serves to cope with a power failure. More specifically, the sensor means 340 and 342 enable the detection of the posiion of the photographic paper 216 after a power failure has been settled and the power supply has consequently been resumed.

Thus, the leading end portion of the newly exposed photographic paper 16 is advanced to the area between the first clamping and transporting rollers 230 and 232 while being guided by the flap 270. When the leading end portion of the paper 216 reaches the area between the sensor means 344 and 346, the rotation of the roller 230 is suspended again, and the flap 270 is moved from the first position and stopped at, for example, the position at which it is suspended vertically downward. As the exposure operation at the printing section 212 proceeds, the exposed portion of the photographic poaper 216 is successively accommodated in the apparatus 210 in the form of the first loop 216A.

Thus, even when the trailing end portion of the cut photographic paper 216 which has been exposed before the suspension of the exposure operation remains undeveloped in the apparatus 210, the leading end portion of the cut photographic paper 216 which is delivered after the resumption of the exposure operation can be accommodated in the first loop accommodating portion of the apparatus 210.

Although in this embodiment the auxiliary flap 312 is pivotally supported at a position near the guide plate 228, the flap 312 may be disposed near the first clamping and transporting roller 230.

Figure 10:
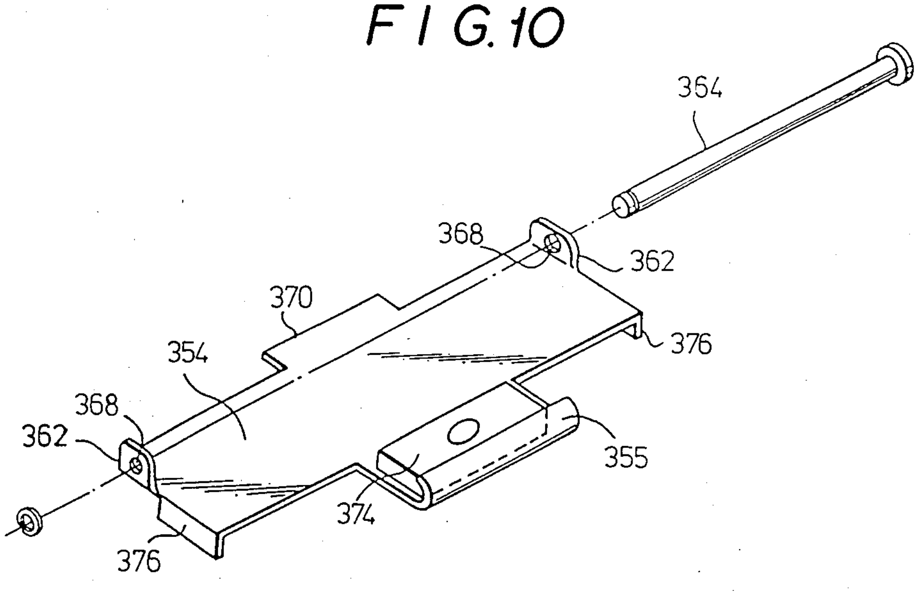
FIG. 10 is a perspective view of the auxiliary flap in accordance with the third embodiment.
Figure 11:
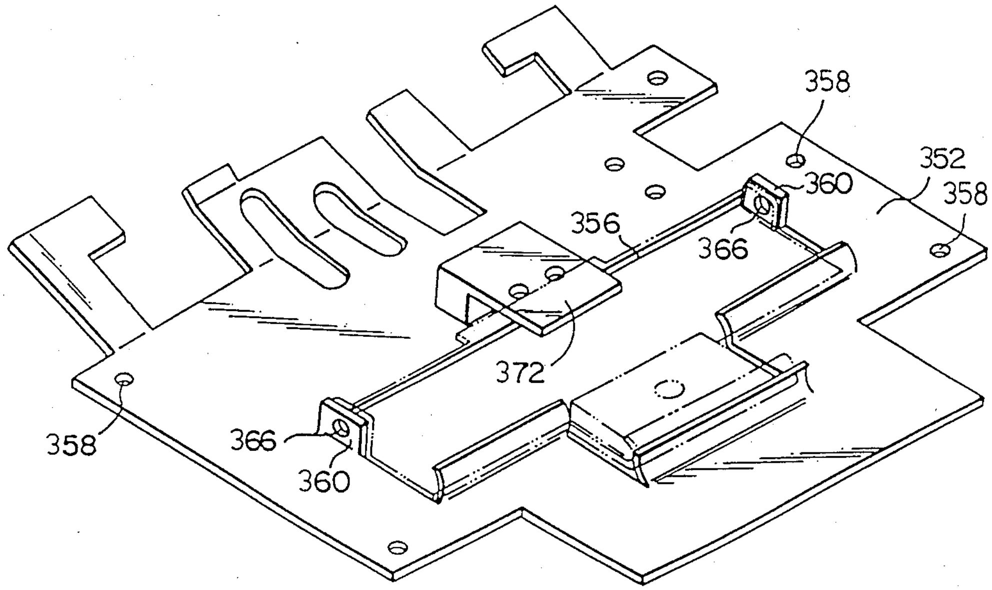
FIG. 11 is a perspective view of a bracket employed to secure the auxiliary flap in accordance with the third embodiment.

A third embodiment of the present invention will be described below in detail with reference to FIGS. 9 to 11.

Figure 9:
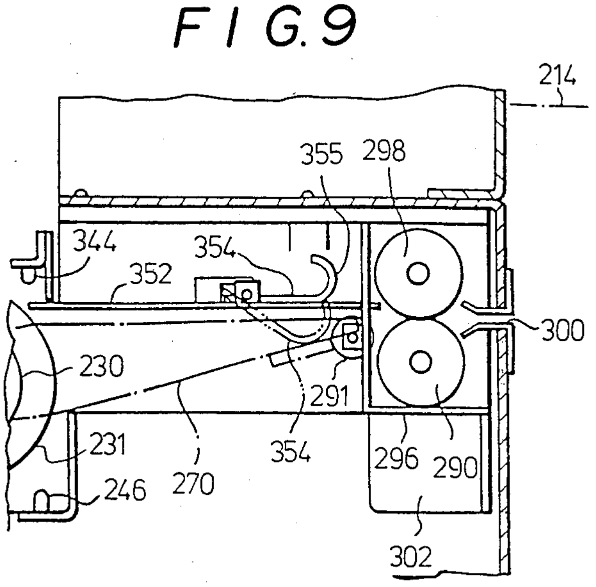
FIG. 9 is a fragmentary sectional view showing a third embodiment of the present invention.

FIG. 9 shows a portion of the third embodiment which corresponds to a portion of the second embodiment which is located between the first and second clamping and transporting rollers 230 and 290. In place of the guide plate 306 in the second embodiment, a bracket 352 is rigidly secured to a portion of the machine frame 218 which is located between the first and second clamping and transporting rollers 230 and 290. An auxiliary flap 354, which is shown in FIG. 10, is secured to this bracket 352 (see FIG. 11).

The bracket 352, which is similar to the bracket 310, is formed from a thin-walled steel material. The bracket 352 is provided with an opening 356 in the center thereof and rigidly secured to the machine frame 218 through screw receiving bores 358.

Projecting pieces 360 respectively project from both lateral edges of the opening 356 for pivotally supporting projecting pieces 362 which project from both lateral edges, respectively, of the auxiliary flap 354. For this purpose, the projecting pieces 360 and 362 are provided with throughholes 366 and 368, respectively.

A stopper 370 projects from the intermediate portion of the auxiliary flap 354. The stopper 370 is adapted to abut against a stopper 372 which is rigidly secured to the bracket 352, thus limiting the angle of rotation of the auxiliary flap 354. A weight member 374 is rigidly secured to the inner side of a semi circular guide portion 355 which is provided on the side of the auxiliary flap 354 opposite to the stopper 370, so that the auxiliary flap 354 is biased in such a manner as to pivot clockwise as viewed in FIG. 9. The auxiliary flap 354 further has projecting pieces 376 respectively projecting from both lateral edges thereof in the direction counter to that in which the projecting peices 362 project so that the projecting pieces 376 abut against the flap 270. Thus, the projecting pieces 376 oppose both lateral edges, respectively, of the passing photographic paper 216 so to serve to prevent meandering of the paper 216.

When the flap 270 is not at the second position, the auxiliary flap 354 is lowered by means of the weight member 374 to cover the inlet area of the second clamping and transporting roller 290 in a manner similar to that in the case of the auxiliary flap 312. However, when the flap 270 is moved to the second position, the flap 270 comes in contact with the projecting pieces 376 and pushes up the auxiliary flap 354, thereby opening the inlet area of the second clamping and transporting roller 290 and, at the same time, defining a photographic paper passing space between the first and second clamping and transporting rollers 230 and 290, the space having a height corresponding to the height of the projecting pieces 376. It should be noted that the arrangement of the other portions of this embodiment is similar to that of the second embodiment.

In order to maintain the auxiliary flap 354 in the state wherein it covers the inlet area of the second clamping and transporting roller 290, a magnet may be provided between the stoppers 370 and 372 to produce a predetermined magnetic attraction force. The same is the case with the auxiliary flap 312.

The operation and advantages of this embodiment are similar to those of the second embodiment. In this embodiment, the auxiliary flap 354 is additionally provided so as to cover the inlet area of the second clamping and transporting roller 290 in the same manner as the auxiliary flap 312. It is therefore possible to prevent the trailing end of the photographic paper 216 from being accidentally clamped between the second clamping and transporting rollers 290 and 298, together with the intermediate portion of the paper 216.

A fourth embodiment of the present invention will be described below.

Figure 12:
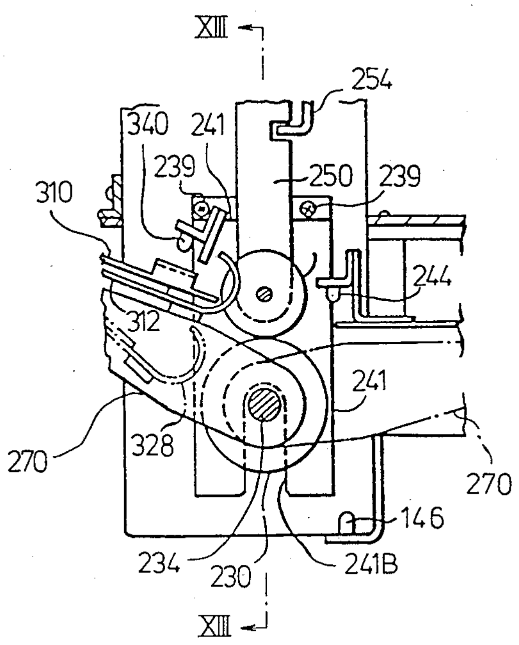
FIG. 12 is a fragmentary sectional view of an essential part of a fourth embodiment of the present invention which corresponds to the first clamping and transporting roller part of the second embodiment.
Figure 13:
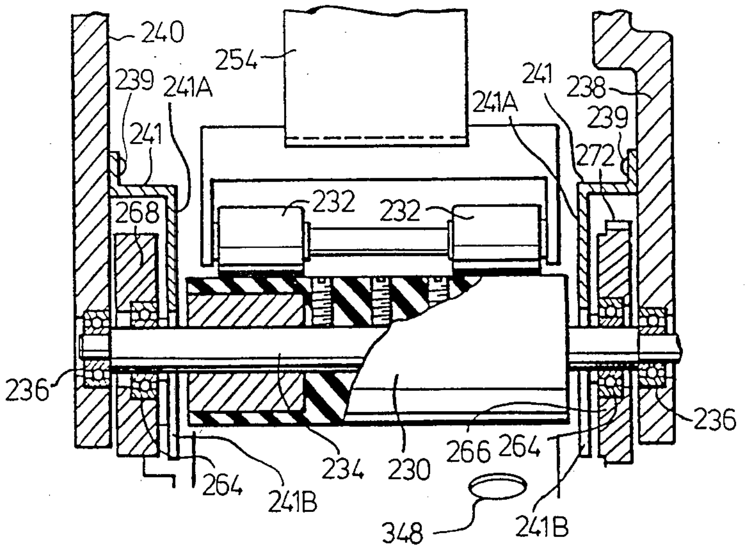
FIG. 13 is a sectional view taken along the line XIII—XIII in FIG. 12.

As shown in FIGS. 12 and 13, in place of the flanges 231 serving as lateral movement limiting means in the second embodiment, guide plates 241 are rigidly secured to the bearing plates 240 through screws 239, respectively. Each guide plate 241 has a projecting piece 241A which is slightly spaced apart from the corresponding outer end of the first clamping and transporting roller 230, and a slot 241B which receives the support shaft 234. Thus, the projecting pieces 241A project beyond the outer periphery of the first clamping and transporting roller 230 in the vicinity of the photographic paper inlet area of the roller 230 so as to guide the lateral edges of the photographic paper 216.

The arrangement of the other portions of the third embodiment is substantially the same as that in the second embodiment.

The following is a description of the operation of this embodiment.

The leading end portion of the photographic paper 216 that has been exposed in the printing section 212 is delivered by the action of the delivery rollers 220 and 222 to reach the guide plate 228. The leading end portion of the paper 216 is advanced to the area between the first clamping and transporting rollers 230 and 232 while moving through the area between the flap 270 and the auxiliary flap 312. During this feed of the photographic paper 216, the lateral movement thereof is limited by the guide projections 320 formed on the auxiliary flap 312, and the projecting pieces 241A provided on both sides, respectively, of the first clamping and transporting roller 230 also serve to limit the lateral movement of the paper 216. Therefore, the leading end portion of the paper 216 is accurately fed to the area between the first clamping and transporting rollers 230 and 232 without any fear of the longitudinal axis of the paper 216 oscillating.

A fifth embodiment of the present invention will be described below.

Figure 14:
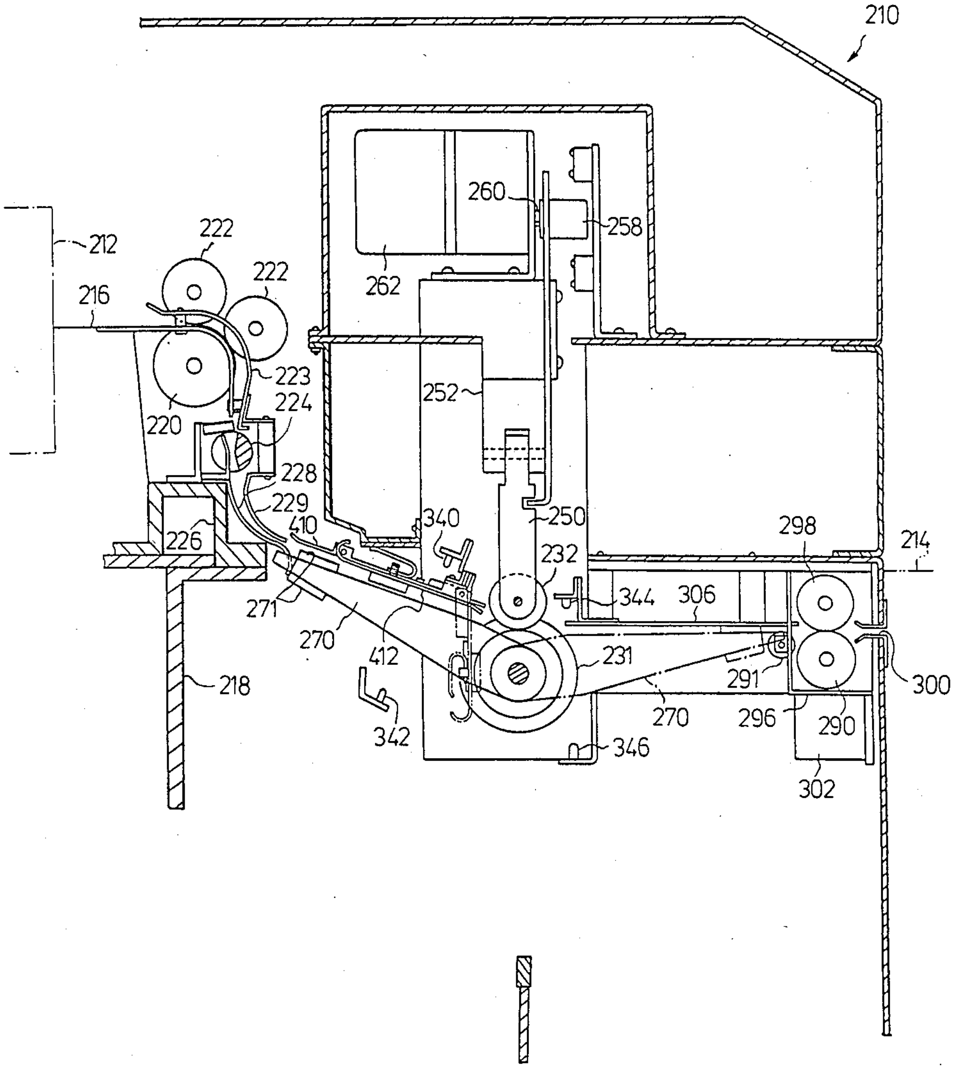
FIG. 14 is a sectional view of a fifth embodiment of the present invention.

This embodiment differs from the second embodiment in the arrangement of a bracket 410 is rigidly secured to the machine frame and a flap is pivotally mounted to said bracket so as to extend between the printing section 212 and the first clamping and transporting roller 230 as shown in FIG. 14. The arrangement of the other portions of the fifth embodiment is substantially the same as that of the second embodiment, and description thereof is therefore omitted.

Figure 15:
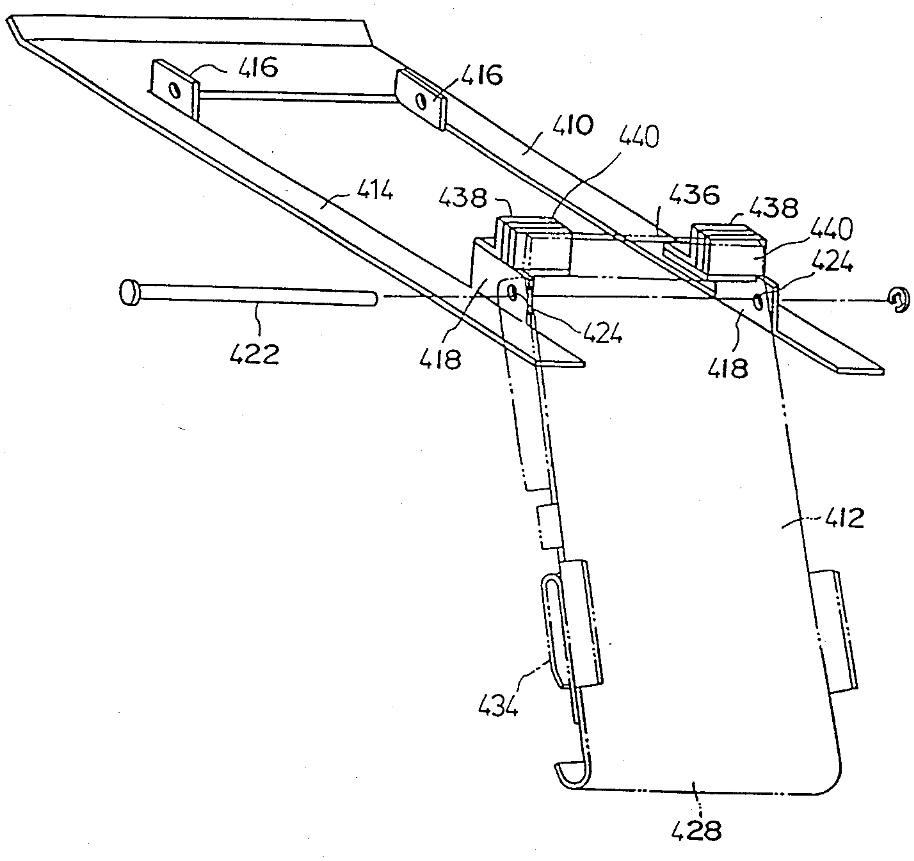
FIG. 15 is a perspective view of a bracket employed to secure the auxiliary flap in accordance with the fifth embodiment.
Figure 16:
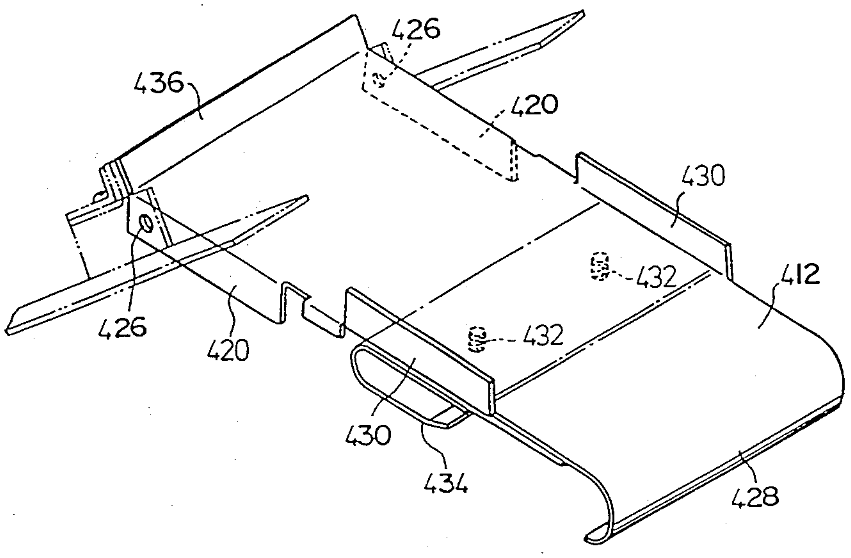
FIG. 16 is a perspective view of the auxiliary flap of the fifth embodiment.

Namely, the bracket 410 is, as shown in FIG. 15, formed from a thin-walled steel material. An opening 414 is provided in a portion of the bracket 410 on the side thereof which is closer to the first clamping and transporting roller 230, and projecting pieces 416 project from both lateral edges, respectively, of the opening 414 on the side thereof which is closer to the printing section 212, the projecting pieces 416 being employed to secure the bracket 410 to the machine frame 218.

In addition, projecting pieces 418 project from both lateral edges, respectively, of an end portion of the opening 414 which is closer to the first clamping and transporting roller 230, so that the projecting pieces 418 pivotally support, through a pin 422, projecting pieces 420 which are respectively provided at both lateral edges of the auxiliary flap 412. For this purpose, the projecting pieces 418 and 420 are respectively provided with through-holes 424 and 426.

The distal end portion of the auxiliary flap 412 is formed into a semi-circular guide portion 428 which protects the passing photographic paper 216.

Projecting pieces 430 project from both lateral edges, respectively, of the central portion of the auxiliary flap 412 in the direction opposite to that in which the projecting pieces 420 extend. When the flap 270 is moved to the first position, the flap 270 comes in contact with the porojecting pieces 430 and pushes up the auxiliary flap 412 with the distal end thereof directed toward the printing section 212, so that the auxiliary flap 412 cooperates with the flap 270 to define a photographic paper passing space therebetween, as shown in FIG. 14. More specifically, the projecting pieces 430 abut against both lateral edge portions, respectively, of the flap 270 and define a gap between the auxiliary flap 412 and the flap 270, the gap having a height corresponding to the height of the projecting pieces 430, thus providing a photographic paper passing space. In addition, this pair of projecting pieces 430 respectively oppose both lateral edge portions of the photographic paper 216 being advanced to the first clamping and transporting rollers 230 and 232 and serve to prevent meandering of the paper 216.

When the flap 270 is turned from the first position to the vertically downward position, the auxiliary flap 412 is gravitationally pivoted about the pin 122 and suspended as shown by the imaginary line in FIG. 14. In this suspended state, the auxiliary flap 412 covers the photographic paper inlet area of the first clamping and transporting roller 230. More specifically, this auxiliary flap 412 covers the photographic paper insertion area over about ¼ of the outer periphery of the roller 230 from the area of contact between the rollers 230 and 232, thereby eliminating the problem that the trailing end portion of the photographic paper 216 delivered from the printing section 212 may accidentally spring back into the area between the first clamping and transporting rollers 230 and 232 due to the rigidity of the paper 216 at the moment said trailing end portion separates from the guide plate 228. A U-shaped plate 434 is secured to the auxiliary flap 412 by screws 432 in order to prevent the trailing end portion of the paper 216 from contacting the guide portion 428 or other portions.

When the auxiliary flap 412 is disposed in such a manner as to cover the photographic paper inlet area of the first clamping and transporting rollers 230, the pair of projecting pieces 430 are disposed outside the axial ends, respectively, of the roller 230 so as to cover the inlet area of the roller 230 even more reliably.

The auxiliary flap 412 further has a stopper 436 provided in the vicinity of the projecting pieces 420, the stopper 436 opposing stoppers 438 respectively secured to the projecting pieces 418. These stoppers 436 and 438 serve to limit the angle of rotation of the guide portion 428 in order to prevent the auxiliary flap 412 from contacting the first clamping and transporting roller 230. In addition, magnets 440 are rigidly secured to the stoppers 438, respectively, so as to attract the stopper 436, thereby maintaining the auxiliary flap 412 in the vertical position by means of a predetermined magnetic attraction force. The magnitude of the attraction force of the magnets 440 is so set that, when the flap 270 is turned clockwise as viewed in FIG. 14 from the vertical position to the first position, the auxiliary flap 412 is turned together with the flap 270 without any hindrance.

The following is a description of the operation of this embodiment.

Prior to the start of an exposure operation at the printing section 212, the flap 270 is disposed at the first position as shown by the solid line in FIG. 14. In this position, the flap 270 pushes up the auxiliary flap 412 through the projecting pieces 430 and cooperates with the auxiliary flap 412 to define a space for passing the photographic paper 216.

The leading end portion of the photographic paper 216 that has been exposed in the printing section 212 is delivered by the action of the delivery rollers 220 and 222 to reach the guide plate 228. The leading end portion of the paper 216 is advanced to the area between the first clamping and transporting rollers 230 and 232 while moving through the area between the flap 270 and the auxiliary flap 312. During this feed of the photographic paper 216, the lateral movement thereof is limited by the projecting pieces 271 formed on the flap 270 and the guide projections 320 formed on the auxiliary flap 412, and the flanges 231 (see FIG. 5) formed on the first clamping and transporting roller 230 also serve to limit the lateral movement of the paper 216. Therefore, the leading end portion of the paper 216 is accurately fed to the area between the first clamping and transporting rollers 230 and 232 without any fear of the longitudinal axis of the paper 216 oscillating.

When the sensor means 344 and 346 detect the leading end of the photographic paper 216, the rotation of the motor 246 (see FIG. 5) is suspended, and the movement of the leading end portion of the paper 216 is thereby stopped.

Figure 17A:
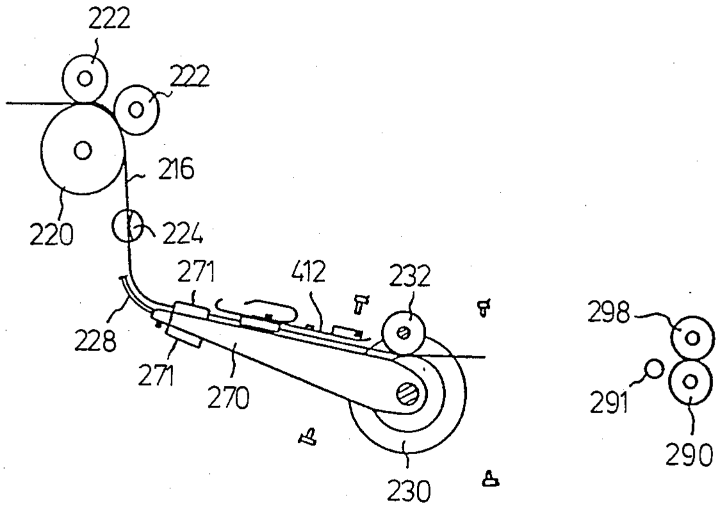
FIGS. 17(A) to 17(E) show the guide member of the fifth embodiment in various operative states, respectively.
Figure 17B:
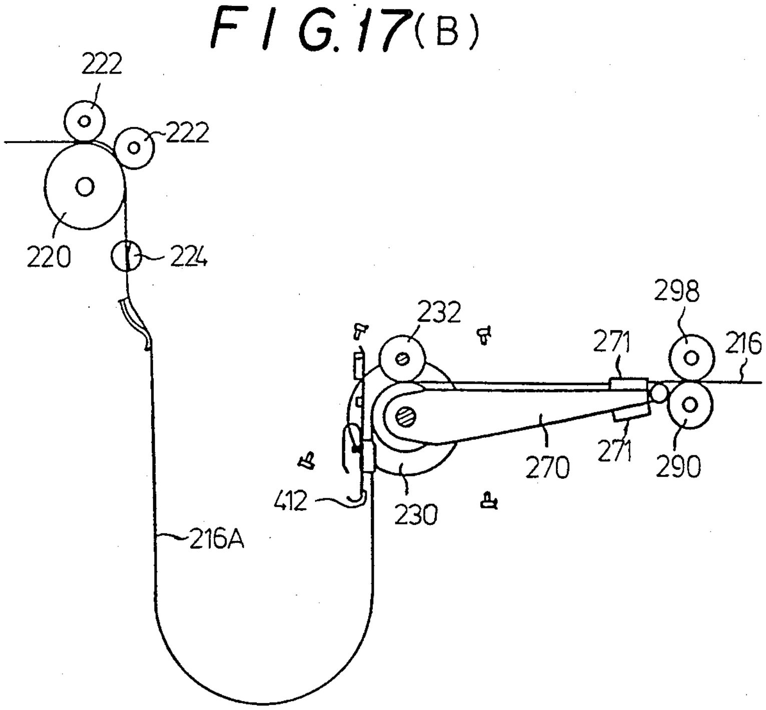

Then, the flap 270 is rotated counterclockwise as viewed in FIG. 14 so as to move to the second position, as shown in FIG. 17(B), and the auxiliary flap 312 is brought into the imaginary line position shown in FIG. 14 to cover the inlet area of the first clamping and transporting roller 230. At the same time, the operation of the motor 246 is resumed. Since the intermediate portion of the photographic paper 216 exposed at the printing section 212 is delivered therefrom at a relatively high feed rate, the first loop 216A is formed between the guide plate 228 and the first clamping and transporting roller 230.

At the same time, the leading end portion of the photographic paper 216 fed out from the area between the first clamping and transporting rollers 230 and 232 moves on the flap 270 so as to reach the area between the second clamping and transporting rollers 290 and 298 from which it is advanced by the rotation of the motor 302 to the developing section 214 where the paper 216 is successively developed.

When the leading end portion of the photographic paper 216 has been fed out from the area between the second clamping and transporting rollers 290 and 298 by the rotation of the motor 302, the first clamping and transporting roller 232 is moved upwards by the rotation of the motor 262 so as to separate from the roller 230, so that the photographic paper 216 is advanced to the developing section 214 by the force of the motor 302 alone.

When the photographic paper 216 which is passed over the first clamping and transporting roller 230 is not subjected to the clamping force applied thereto from the first clamping and transporting roller 232. The paper 216 is apt to meander during the advancement. However, meandering of the paper 216 is prevented by virtue of the flanges 231 and the guide portion 428 of the auxiliary flap 412 which is disposed within the area between the flanges 231.

When the exposure operation at the printing section 212 is to be temporarily suspended, the intermediate portion of the photographic paper 216 is cut by using the cutter 224. Even during the suspension of the exposure operation, the exposed photographic paper 216 is gradually delivered to the developing section 214 at a relatively low feed rate, thereby allowing the developing operation to proceed.

When the trailing end portion of the thus cut photographic paper 216 is released from the guide plate 228, the trailing end portion of the paper 216 may spring back into the area between the first clamping and transporting rollers 230 and 232 due to the rigidity of the paper 216.

However, since in this embodiment the auxiliary flap 412 which has already been lowered by its own weight covers the front side of the first clamping and transporting rollers 230 and 232, there is no fear of the trailing end portion of the cut photographic paper 216 entering the area between the first clamping and transporting rollers 230 and 232.

Figure 17C:
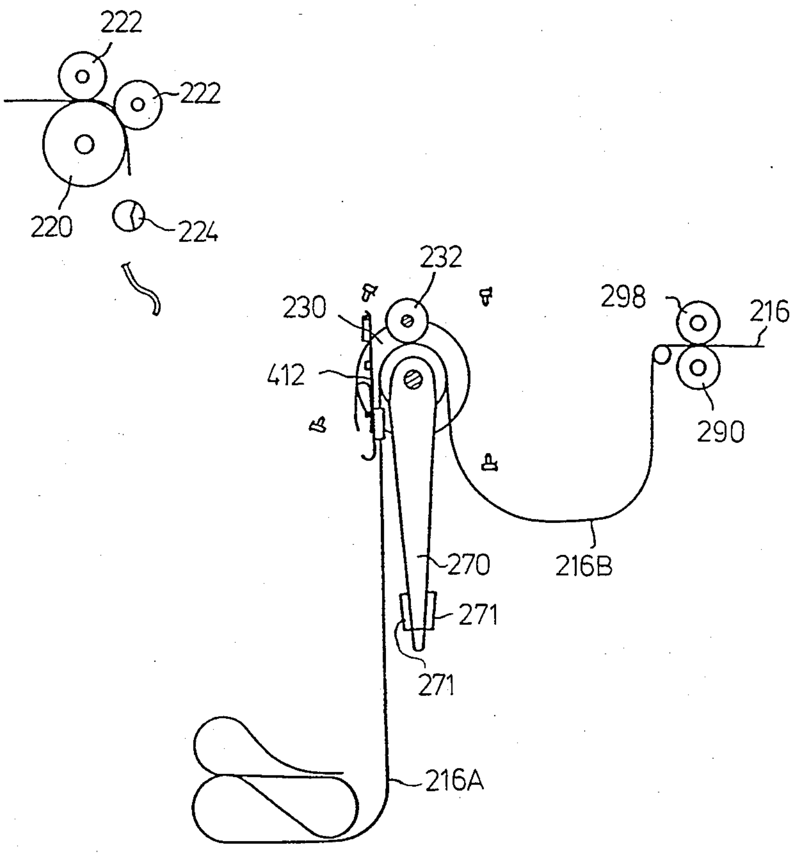

To resume the exposure operation at the printing section 212 in a state wherein the trailing end portion of the exposed photographic paper 216 remains in the form of the first loop 216A between the guide plate 228 and the first clamping and transporting roller 230, the flap 270 is moved from the second position to the vertically downward position by driving the motor 246 (see FIG. 5), as shown in FIG. 17(C). Under this state, the first clamping and transporting roller 232 is brought into contact with the roller 230, and the roller 230 is rotated by driving the motor 246. In consequence, the photographic paper 216 in the form of the first loop 216A is moved so as to form the second loop 216B.

Figure 17D:
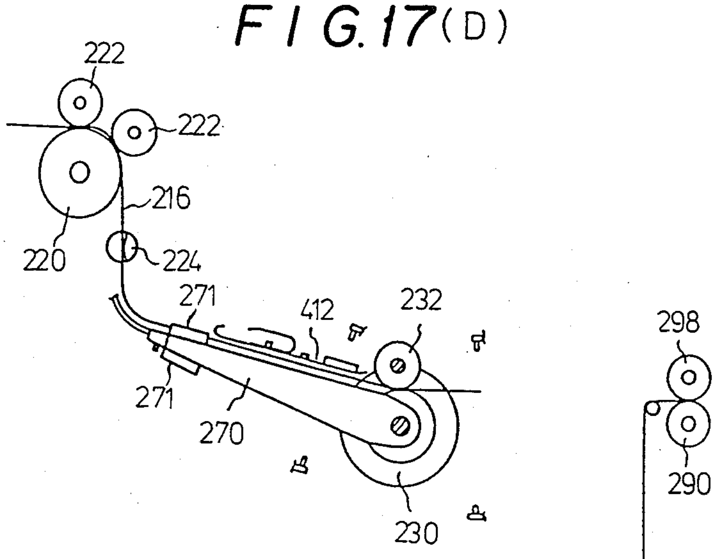
Figure 17E:
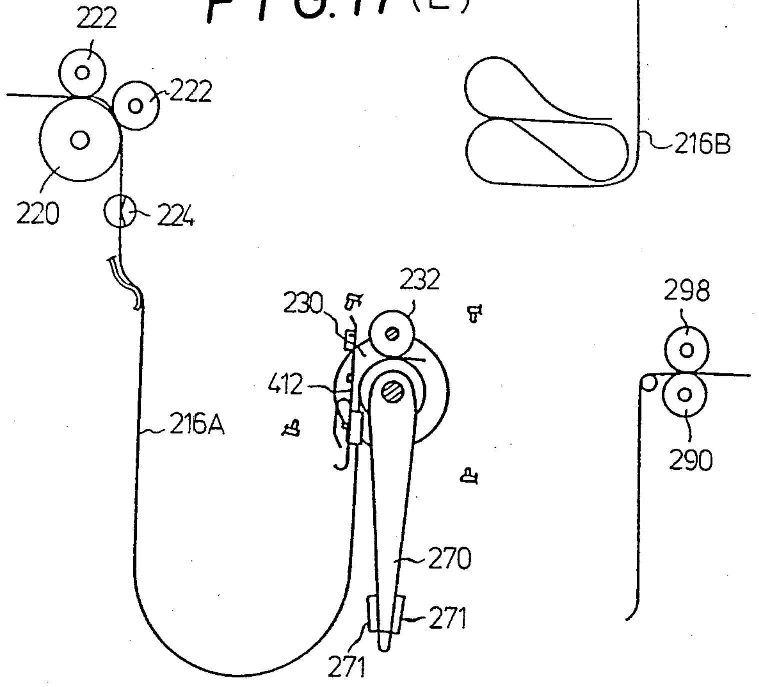

As the delivery of the photographic paper 216 by the first clamping and transporting rollers 230 and 232 further proceeds, the trailing end portion of the paper 216 is suspended down from the second clamping and transporting roller 290, as shown in FIG. 17(D). At this time, the flap 270 is moved to the first position at which it prevents the formation of the first loop 216A, and the exposure operation at the printing section 212 is then resumed.

This pivotal movement of the flap 270 is effected in response to a command for moving the flap 270 to the first position, the command being issued when the trailing end of the photographic paper 216 has passed through the area between the sensor means 344 and 346. However, there are cases where the trailing end portion of the photographic paper 216 remains in contact with the first clamping and transporting roller 230 due to the frictional force occurring between the same and the roller 230. In such cases, the sensor means 344 and 346 cannot detect the passage of the trailing end of the photographic paper 216; therefore, the flap 270 cannot be moved to the first position. However, since this embodiment has another pair of sensor means 340 and 342, if the flap 270 is turned to the first position when a predetermined period of time has elapsed after the trailing end of the photographic paper 216 has passed through the area between the sensor means 340 and 342, it is possible to reliably move the flap 270 to the first position even when the trailing end portion of the paper 216 is forced to remain on the first clamping and transporting roller 230 by the frictional force.

The provision of the sensor means 340 and 342 also serves to cope with a power failure. More specifically, the sensor means 340 and 342 enable the detection of the posiion of the photographic paper 216 after a power failure has been settled and the power supply has consequently been resumed.

Thus, the leading end portion of the newly exposed photographic paper 16 is advanced to the area between the first clamping and transporting rollers 230 and 232 while being guided by the flap 270. When the leading end portion of the paper 216 reaches the area between the sensor means 344 and 346, the rotation of the roller 230 is suspended again, and the flap 270 is moved from the first position and stopped at, for example, the position at which it is suspended vertically downward. As the exposure operation at the printing section 212 proceeds, the exposed portion of the photographic poaper 216 is successively accommodated in the apparatus 210 in the form of the first loop 216A.

Thus, even when the trailing end portion of the cut photographic paper 216 which has been exposed before the suspension of the exposure operation remains undeveloped in the apparatus 210, the leading end portion of the cut photographic paper 216 which is delivered after the resumption of the exposure operation can be accommodated in the first loop accommodating portion of the apparatus 210.

What is claimed is:

1. A photographic paper accommodating apparatus which is disposed on the downstream side of a printing section for transporting an exposed continuous photographic paper to a subsequent step, which comprises:

(a) first clamping and transporting roller means disposed on the downstream side of said printing section so as to clamp and transport said photographic paper and form a first loop of said photographic paper between said printing section and said roller means;

(b) second clamping and transporting roller means disposed on the downstream side of said first clamping and transporting roller mens so as to clamp and transport said photographic paper and form a second loop of said photographic paper between said first and second clamping and transporting roller means;

(c) a guide member movable between a first position at which said guide member guides said photographic paper toward said first clamping and transporting roller means, and a second position at which said guide member guides said photographic paper toward said second clamping and transporting roller means; and (d) means for limiting the lateral movement of said photographic paper disposed along a passage of said photographic paper.

2. A photographic paper accommodating apparatus according to claim 1, wherein said limit means includes a pair of flanges provided at both ends, respectively, of said first clamping and transporting roller means in the lateral direction of said photographic paper.

3. A photographic paper accommodating apparatus according to claim 1, wherein said limit means is defined by a pair of guide blocks which are provided in opposing relation to both lateral edges, respectively, of at least one of said first and second loops of said photographic paper.

4. A photographic paper accommodating apparatus according to claim 3, wherein said pair of guide blocks respectively have tapered portions which oppose both lateral edges, respectively, of said photographic paper so as to prevent meandering of said paper.

5. A photographic paper accommodating apparatus according to claim 1, further comprising a first auxiliary flap disposed between said printing section and said first clamping and transporting roller means and adapted such that, when said guide means is not at said first position, said first auxiliary flap covers the photographic paper inlet area of said first clamping and transporting roller means.

6. A photographic paper accommodating apparatus according to claim 5, wherein said limit means includes a pair of projecting pieces which are provided on said first auxiliary flap and adapted such that, when said guide member is at said first position, said projecting pieces abut against said guide member so as to ensure the transport passage of said photographic paper.

7. A photographic paper accommodating apparatus according to claim 5, further comprising a second auxiliary flap disposed between said first and second clamping and transporting roller means and adapted such that, when said guide member is not at said second position, said second auxiliary flap covers the photographic paper inlet area of said second clamping and transporting roller means.

8. A photographic paper accommodating apparatus according to claim 5, further comprising first sensor means disposed on the upstream side of said first clamping and transporting roller means for detecting whether or not the trailing end of said photographic paper has reached said first clamping and transporting roller means, and second sensor means disposed on the downstream side of said first clamping and transporting roller means for detecting whether or not the leading end of said photographic paper has been delivered therefrom.

9. A photographic paper accommodating apparatus according to claim 1, wherein said limit means includes a pair of guide plates which are disposed in the vicinity of both sides, respectively, of said first clamping and transporting roller means in the lateral direction of said photographic paper.

10. A photographic paper accommodating apparatus according to claim 1, wherein said guide member is defined by a flap which is pivotally supported by both end portions of said first clamping and transporting means in the lateral direction of said photographic paper.

11. A photographic paper accommodating apparatus according to claim 10, further comprising drive means for pivoting said flap between said first and second positions.

12. A photographic paper accommodating apparatus according to claim 11, wherein said first clamping and transporting roller means includes a first roller positioned on one side of the photographic paper transport passage so as to pivotally support said flap, and a second roller positioned on the other side so as to clamp and transport said photographic paper in cooperation with said first roller.

13. A photographic paper accommodating apparatus according to claim 12, further comprising means for moving said first and second rollers toward and away from each other.

14. A photographic paper accommodating apparatus according to claim 1, wherein said limit means includes a pair of projecting pieces which are provided at the distal end portion of said flap and adapted such that, when said flap is at either said first or second position, said projecting pieces are positioned on both sides, respectively, of the photographic paper transport passage.

15. A photographic paper accommodating apparatus which is disposed on the downstream side of a printing section for transporting an exposed continuous photographic paper to a developing section along a photographic paper transport passage, which comprises:

(a) a machine frame for said apparatus;

(b) a pair of first clamping and transporting rollers supported by said machine frame and disposed on the downstream side of said printing section so as to clamp and transport said photographic paper and form a first loop of said photographic paper between said printing section and said rollers;

(c) a pair of second clamping and transporting rollers supported by said machine frame and disposed on the downstream side of said first clamping and transporting rollers so as to clamp and transport said photographic paper and form a second loop of said photographic paper between said first and second clamping and transporting rollers;

(d) a flap pivotally supported by the shaft of either one of said first clamping and transporting rollers and movable between a first position at which said flap guides said photographic paper toward said first clamping and transporting rollers, and a second position at which said flap guides said photographic paper toward said second clamping and transporting rollers;

(e) means for pivoting said flap between said first and second positions; and (f) means for limiting the lateral movement of said photographic paper disposed along a passage of said photographic paper.

16. A photographic paper accommodating apparatus according to claim 15, wherein said limiting means is comprised of a pair of guide blocks disposed on said machine frame in opposing relation to both lateral edges, respectively, of at least one of said first and second loops of said photographic paper.

17. A photographic paper accommodating apparatus according to claim 16, wherein said pair of guide blocks respectively have tapered portions which oppose both lateral edges, respectively, of said photographic paper so as to prevent meandering of said paper.

18. A photographic paper accommodating apparatus according to claim 15, further comprising a first auxiliary flap supported by said machine frame and disposed between said printing section and said first clamping and transporting rollers, said first auxiliary flap being adapted such that, when said flap is not at said first position, said first auxiliary flap covers the photographic paper inlet area of said first clamping and transporting rollers.

19. A photographic paper accommodating apparatus according to claim 18, wherein said first auxiliary flap is provided with a pair of projecting pieces which are adapted such that, when said flap is at said first position, said projecting pieces abut against said flap so as to ensure the photographic paper transport passage and limit the lateral movement of said photographic paper.

20. A photographic paper accommodating apparatus according to claim 18, further comprising a second auxiliary flap supported by said machine frame and disposed between said first and second clamping and transporting rollers, said second auxiliary flap being adapted such that, when said flap is not at said second position, said second auxiliary flap covers the photographic paper inlet area of said second clamping and transporting rollers.

21. A photographic paper accommodating apparatus according to claim 18, further comprising a first sensor disposed on means portion of said machine frame between said printing section and said first clamping and transporting rollers for detecting whether or not the trailing end of said photographic paper has reached said first clamping and transporting rollers, and a second sensor disposed on a portion of said machine frame between said first and second clamping and transporting rollers for detecting whether or not the leading end of said photographic paper has been delivered therefrom.

22. A photographic paper accommodating apparatus according to claim 15, wherein said one of the pair of first clamping and transporting rollers has a pair of flanges respectively provided at both ends thereof in the lateral direction of said photographic paper, said flanges being adapted to limit the lateral movement of said photographic paper.

23. A photographic paper accommodating apparatus according to claim 15, wherein said machine frame is provided with guide plates in the vicinity of both axial ends of said one of the pair of first clamping and transporting rollers so as to limit the lateral movement of said photographic paper.

24. A photographic paper accommodating apparatus according to claim 15, wherein said flap has a pair of projecting pieces provided at the distal end portion thereof, said projecting pieces being positioned along both lateral edges, respectively, of said photographic paper when said flap is at either said first or second position, so as to limit the lateral movement of said photographic paper.

25. A photographic paper accommodating apparatus according to claim 15, further comprising means for moving the other one of said pair of first clamping and transporting rollers toward and away from said one roller.

26. A photographic paper accommodating apparatus according to claim 15, further comprising a cutter for cutting said photographic paper, said cutter being disposed on the downstream side of said printing section.

27. A photographic paper accommodating apparatus according to claim 15, further comprising plate means disposed on said auxiliary flap to prevent the photographic paper from contacting the guide portion and the vicinity thereof, and wherein said bracket is rigidly secured to the machine frame and said flap is pivotally mounted to said bracket for extending between the printing section and first clamping and transporting roller.

* * * * *